(12) United States Patent
Shinotsuka et al.

(10) Patent No.: US 10,051,412 B2
(45) Date of Patent: Aug. 14, 2018

(54) LOCATIONAL INFORMATION TRANSMISSION SYSTEM, LOCATIONAL INFORMATION TRANSMISSION APPARATUS, AND INFORMATION PROCESSING DEVICE

(71) Applicants: Michiaki Shinotsuka, Kanagawa (JP); Tsutomu Kawase, Kanagawa (JP)

(72) Inventors: Michiaki Shinotsuka, Kanagawa (JP); Tsutomu Kawase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/045,863

(22) Filed: Feb. 17, 2016

(65) Prior Publication Data

US 2016/0249160 A1   Aug. 25, 2016

(30) Foreign Application Priority Data

Feb. 25, 2015  (JP) ................... 2015-035693
Oct. 30, 2015  (JP) ................... 2015-215161

(51) Int. Cl.
*H04W 4/02* (2018.01)
*G01S 5/02* (2010.01)
(Continued)

(52) U.S. Cl.
CPC ............. *H04W 4/02* (2013.01); *G01S 1/042* (2013.01); *G01S 1/68* (2013.01); *G01S 1/725* (2013.01); *G01S 1/74* (2013.01); *G01S 5/0263* (2013.01)

(58) Field of Classification Search
CPC .......... G01S 5/02; G01S 5/0252; G01S 1/042; G01S 1/168; G01S 1/725; G01S 5/0263;
(Continued)

(56) References Cited

U.S. PATENT DOCUMENTS 6,336,072 B1   1/2002   Takayama et al.
8,203,910 B2   6/2012   Zhao et al.
(Continued)

FOREIGN PATENT DOCUMENTS

JP   2000-098034   4/2000
JP   4297337       7/2009
(Continued)

OTHER PUBLICATIONS

Extended European Search Report dated Jul. 5, 2016 in Patent Application No. 16156520.5.

*Primary Examiner* — Kamran Afshar
*Assistant Examiner* — Nicole Louis-Fils
(74) *Attorney, Agent, or Firm* — Oblon, McClelland, Maier & Neustadt, L.L.P.

(57) ABSTRACT

A locational information transmission apparatus that transmits information for identifying a location is provided. The locational information transmission apparatus includes a radio communication unit that performs radio communication; a sound wave transmitting unit that transmits a sound wave including first identification information; a radio wave transmitting unit that transmits a radio wave including second identification information; and a transmission control unit that changes, depending on control information reported via the radio communication, a method of transmitting the sound wave or a method of transmitting the radio wave.

13 Claims, 18 Drawing Sheets

(51) Int. Cl.
*G01S 1/68* (2006.01)
*G01S 1/74* (2006.01)
*G01S 1/04* (2006.01)
*G01S 1/72* (2006.01)

(58) Field of Classification Search
CPC ...... G01S 1/74; H04L 29/08657; H04W 4/02; H04W 64/00
USPC .......................................... 455/456.1–456.3
See application file for complete search history.

(56) References Cited

U.S. PATENT DOCUMENTS

| | | | |
|---|---|---|---|
| 8,477,690 B2 | 7/2013 | Khoryaev et al. | |
| 2003/0072288 A1* | 4/2003 | Kuffner | H04W 16/14 370/336 |
| 2007/0173212 A1* | 7/2007 | Mergler | G08C 19/28 455/92 |
| 2007/0286433 A1* | 12/2007 | Yoshino | H04S 7/302 381/82 |
| 2010/0109849 A1* | 5/2010 | Wang | G01S 5/18 340/10.5 |
| 2011/0018687 A1* | 1/2011 | Holm | G01S 1/72 340/10.1 |
| 2012/0273192 A1 | 11/2012 | Schmidt et al. | |
| 2013/0234893 A1 | 9/2013 | Kusakari et al. | |
| 2015/0117160 A1* | 4/2015 | Sakurada | G01S 1/68 367/197 |

FOREIGN PATENT DOCUMENTS

| | | |
|---|---|---|
| JP | 2009-288245 | 12/2009 |
| JP | 2011-070516 | 4/2011 |
| JP | 4904471 | 3/2012 |
| JP | 5154630 | 2/2013 |
| JP | 2013-214941 | 10/2013 |
| WO | WO 2004/051304 A1 | 6/2004 |

* cited by examiner

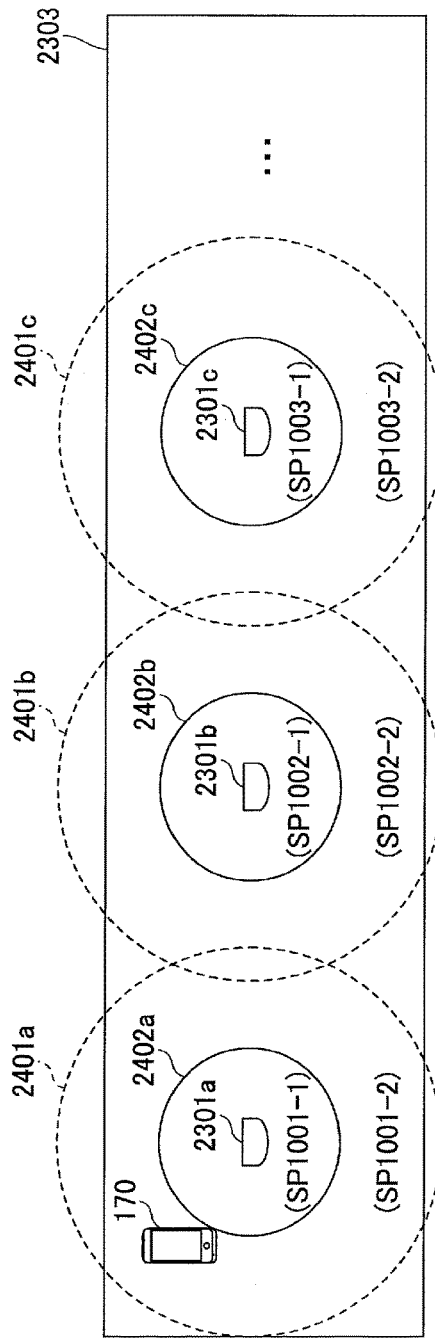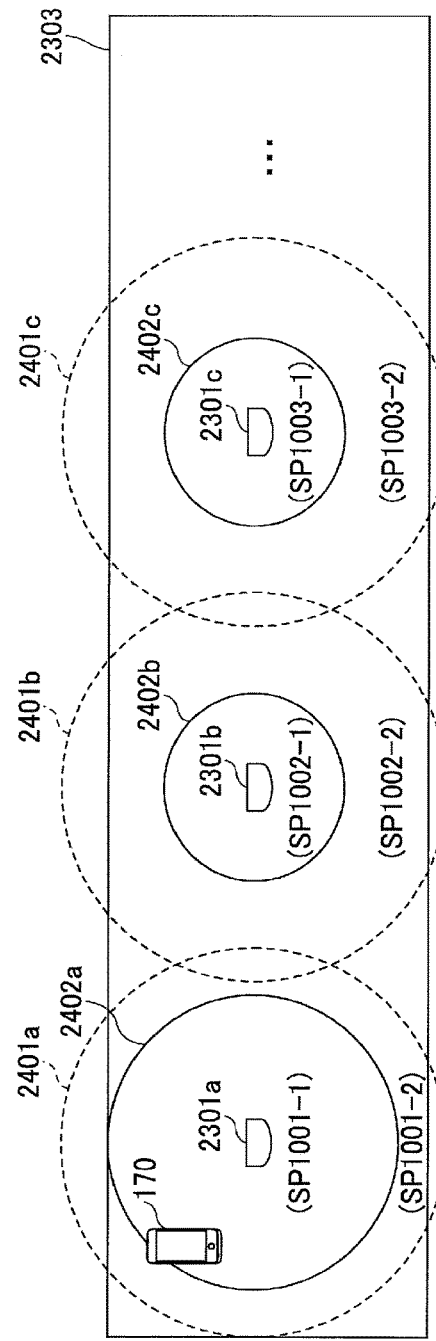

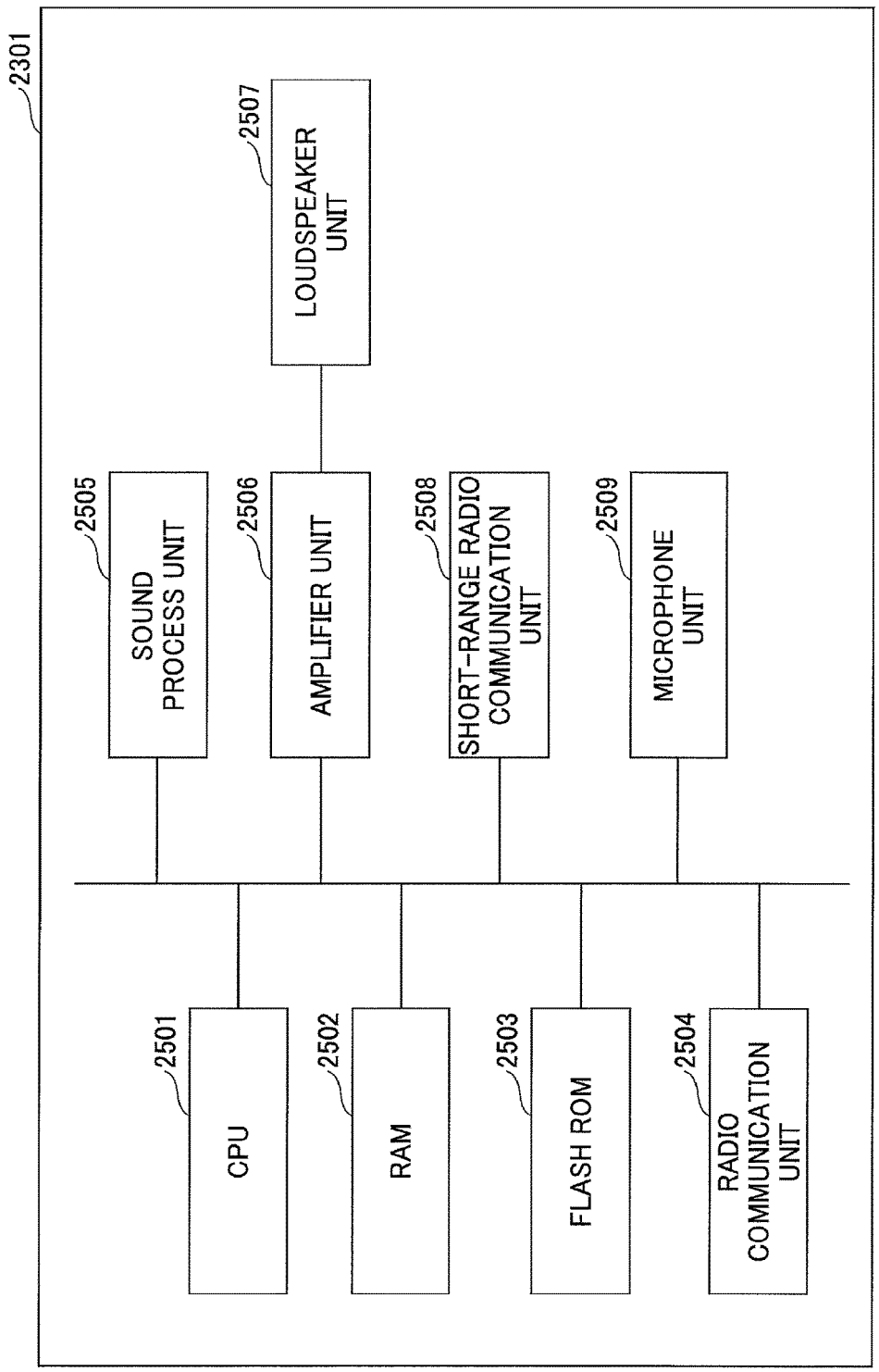

FIG.8A

| CONTROL ITEM | SOUND WAVE ID | RADIO WAVE ID | DEFAULT VALUE | CHANGED VALUE |
|---|---|---|---|---|
| TRANSMISSION INTERVALS OF RADIO WAVES | YES | YES | ONCE PER 10 SECONDS | — |
|  | NO | YES |  | ONCE PER 1 SECOND |
|  | YES | NO |  | — |
| OUTPUT LEVEL OF RADIO WAVES | YES | YES | ±0dB | — |
|  | NO | YES |  | +6dB |
|  | YES | NO |  | −3dB |
|  | PLURAL | — | ... | ... |
| ... |  |  |  |  |

FIG.8B

| CONTROL ITEM | SOUND WAVE ID | RADIO WAVE ID | DEFAULT VALUE | CHANGED VALUE | PRIORITY |
|---|---|---|---|---|---|
| TRANSMISSION INTERVALS OF RADIO WAVES | YES | YES | ONCE PER 10 SECONDS | ONCE PER 1 SECOND | 1 |
| | NO | YES | | - | |
| | YES | NO | | - | |
| OUTPUT LEVEL OF RADIO WAVES | YES | YES | ±0dB | - | 1 |
| | NO | YES | | +6dB | |
| | YES | NO | | -3dB | |
| | PLURAL | - | | - | |
| OUTPUT LEVEL OF SOUND WAVES | YES | YES | ±0dB | - | 2 |
| | NO | YES | | +6dB | |
| | YES | NO | | - | |
| | - | PLURAL | | -3dB | |
| FREQUENCY OF SOUND WAVES | YES | YES | f1 | - | 3 |
| | NO | YES | | f2 | |
| | YES | NO | | - | |
| NUMBER OF SOUND WAVES | YES | YES | f1 | - | 4 |
| | NO | YES | | f1, f2 | |
| | YES | NO | | - | |
| ... | ... | ... | ... | ... | ... |

| TRANSMISSION DEVICE ID | SOUND WAVE ID | RADIO WAVE ID | LOCATION COORDINATES | DESCRIPTION OF LOCATION | ... |
|---|---|---|---|---|---|
| ID0001 | SP1001-1 | SP1001-2 | (x0001, y0001, z0001) | NORTHERN END OF FIRST PASSAGE | ... |
| ID0002 | SP1002-1 | SP1002-2 | (x0002, y0001, z0001) | CENTER OF FIRST PASSAGE | ... |
| ID0003 | SP1003-1 | SP1003-2 | (x0003, y0001, z0001) | SOUTHERN END OF FIRST PASSAGE | ... |
| ... | ... | ... | ... | ... | ... |

| TRANSMISSION DEVICE ID | LOUDSPEAKER ID | LOCATION COORDINATES | DESCRIPTION OF LOCATION | ... |
|---|---|---|---|---|
| ID0001 | SP1001 | (x0001, y0001, z0001) | NORTHERN END OF FIRST PASSAGE | ... |
| ID0002 | SP1002 | (x0002, y0001, z0001) | CENTER OF FIRST PASSAGE | ... |
| ID0003 | SP1003 | (x0003, y0001, z0001) | SOUTHERN END OF FIRST PASSAGE | ... |
| ... | ... | ... | ... | ... |

| APP ID | SOUND WAVE ID | RADIO WAVE ID | ACQUISITION DATE AND TIME | TRANSMISSION DEVICE ID | LOCATION COORDINATES |
|---|---|---|---|---|---|
| AP0001 | — | SP1001-2 | 20xx/10/3 10:00 | ID0001 | (x0001, y0001, z0001) |
| AP0002 | SP1002-1 | SP1002-2 | 20xx/10/3 9:59 | ID0002 | (x0002, y0001, z0001) |
| AP0003 | — | SP1002-2 | 20xx/10/3 10:05 | ID0002 | (x0002, y0001, z0001) |
|  |  | SP1003-2 |  | ID0003 | (x0003, y0001, z0001) |
| ... | ... | ... | ... | ... | ... |

2913

LOCATIONAL INFORMATION TRANSMISSION SYSTEM, LOCATIONAL INFORMATION TRANSMISSION APPARATUS, AND INFORMATION PROCESSING DEVICE

BACKGROUND OF THE INVENTION

Field of the Invention

The present invention relates to a locational information transmission system, a locational information transmission apparatus, and an information processing device.

Description of the Related Art

In recent years, Global Positioning System (GPS) receivers have been installed in information terminals such as car navigation systems, smartphones, and tablet terminals, so that it is possible to readily use locational information using the GPS.

Further, a technique called Indoor MEssaging System (IMES) that makes locational information available even in an area of an underground mall is used as an indoor positioning technique. In the IMES, an indoor transmitter is disposed to transmit locational information about the indoor transmitter as radio waves (see Patent Document 1, for example). Further, there is an autonomous ultrasonic indoor positioning system using a location beacon transmitter that transmits ultrasonic signals at predetermined intervals (see Patent Document 2, for example).

For example, in a system that transmits locational information using radio waves such as Bluetooth (registered trademark) or Bluetooth Low Energy (BLE), locational information is transmitted in a relatively wide area (within a radius of 2.5 to 50 m, for example). By contrast, in such a system that transmits locational information using radio waves, intervals to transmit locational information are often set long (10 second intervals, for example) in terms of power consumption or the like. Such a system may not send highly-accurate locational information (within several meters of error, for example) to a moving information terminal.

By contrast, highly-accurate locational information is reported in a relatively narrow area by transmitting the locational information using sound waves such as ultrasonic signals. Further, an existing loudspeaker (as used in a building for announcement) is used to output sound waves and set intervals to transmit locational information shorter (one second intervals or continuously, for example) than in a system that uses radio waves. However, in the system that uses sound waves to transmit locational information, if locational information transmission devices (existing loudspeakers, for example) that output sound waves are distant from each other, obtained locational information may not be continuous.

RELATED ART DOCUMENTS

[Patent Document 1] Japanese Laid-Open Patent Application No. 2013-214941
[Patent Document 2] Japanese Laid-Open Patent Application No. 2009-288245

SUMMARY OF THE INVENTION

It is a general object of at least one embodiment of the present invention to provide a locational information transmission apparatus that improves accuracy of locational information to be sent to a moving information terminal in a locational information transmission system that outputs locational information indoors, for example.

According to an embodiment of the present invention, a locational information transmission apparatus that transmits information for identifying a location is provided. The locational information transmission apparatus includes a radio communication unit that performs radio communication; a sound wave transmitting unit that transmits a sound wave including first identification information; a radio wave transmitting unit that transmits a radio wave including second identification information; and a transmission control unit that changes, depending on control information reported via the radio communication, a method of transmitting the sound wave or a method of transmitting the radio wave.

BRIEF DESCRIPTION OF THE DRAWINGS

Other objects and further features of embodiments will become apparent from the following detailed description when read in conjunction with the accompanying drawings, in which:

FIG. 2A is a diagram showing a plurality of fields according to the embodiment;

FIG. 2B is a diagram showing a plurality of fields according to the embodiment;

FIG. 3 is a diagram showing a hardware configuration of a locational information transmission device according to the embodiment;

FIG. 8A is a diagram showing complementary control information according to the embodiment;

FIG. 8B is a diagram showing complementary control information according to the embodiment;

FIG. 9A is a diagram showing information managed by a locational information management unit according to the embodiment;

FIG. 9B is a diagram showing information managed by a locational information management unit according to the embodiment;

FIG. 9C is a diagram showing information managed by a locational information management unit according to the embodiment;

DESCRIPTION OF THE PREFERRED EMBODIMENTS

[Embodiment]
<System Configuration>

Figure 1:
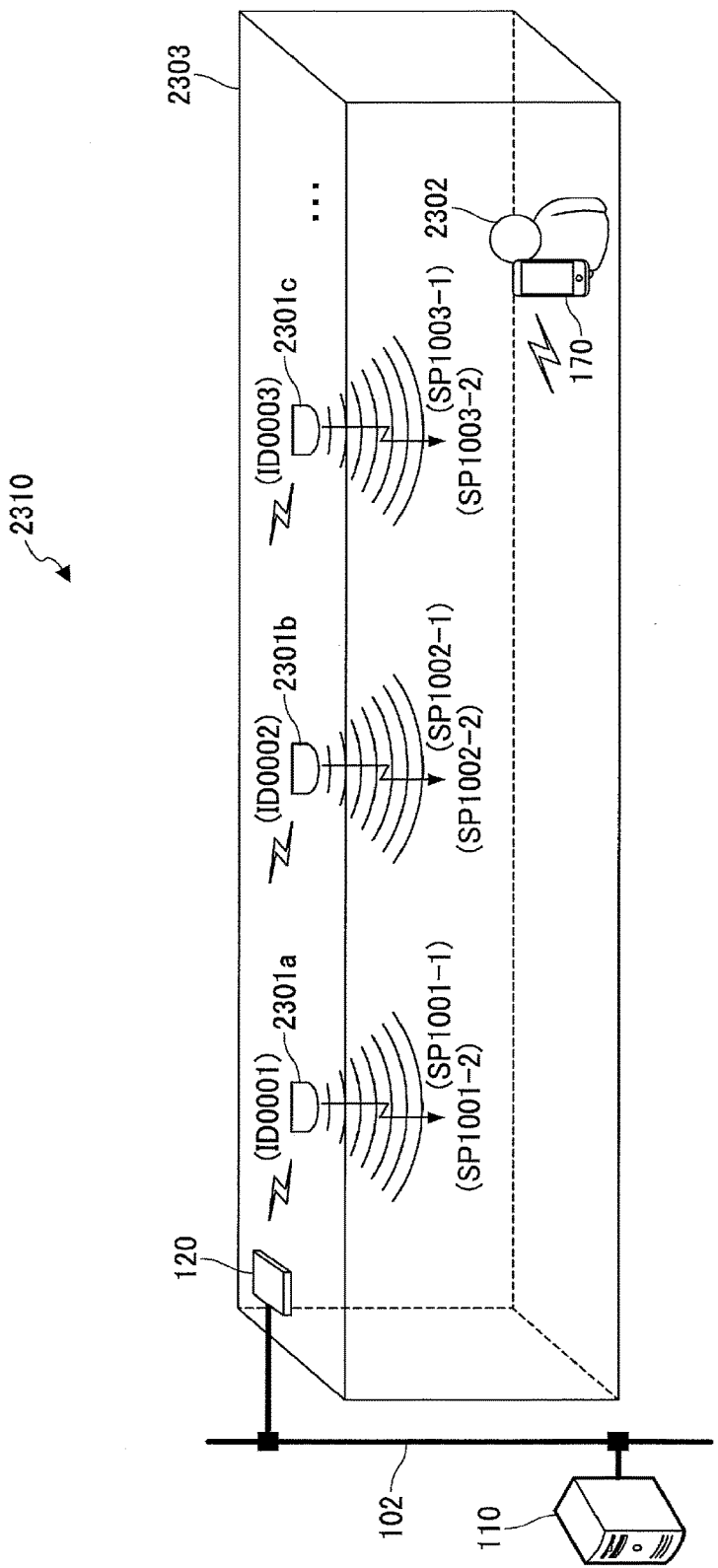
FIG. 1 is a diagram showing a configuration of a locational information transmission system according to an embodiment.

FIG. 1 is a diagram showing a configuration of a locational information transmission system according to an embodiment.

A locational information transmission system 2310 includes a plurality of locational information transmission devices 2301a, 2301b, and 2301c, a location management server 110, a PAN transmitter/receiver 120, and a mobile information terminal 170. In the following description, any one of the locational information transmission devices 2301a, 2301b, and 2301c is indicated by the "locational information transmission device 2301." Further, a number of the locational information transmission devices 2301a, 2301b, and 2301c, a number of the PAN transmitter/receivers 120, and a number of the mobile information terminals 170 are examples.

The locational information transmission devices 2301a, 2301b, and 2301c are disposed at mutually different locations of a ceiling of a building 2303, for example. Each of the locational information transmission devices 2301a, 2301b, and 2301c outputs a signal including information about a location of the device (such as identification information or coordinate information about the device). Further, the locational information transmission devices 2301a, 2301b, and 2301c can communicate with the PAN transmitter/receiver 120 in predetermined radio communication and communicate with the location management server 110 via the predetermined radio communication. The locational information transmission device 2301 may be a locational information transmission device that solely operates or may be a locational information transmission module that is installed in a lighting device and operates receiving power from a power source of the lighting device.

In FIG. 1, the locational information transmission device 2301a has a sound wave transmitting unit such as a loudspeaker and transmits, toward a predetermined field, a sound wave including a sound wave ID "SP1001-1" as identification information unique to the locational information transmission device 2301a. Further, the locational information transmission device 2301a includes a radio wave transmitting unit for Bluetooth Low Energy (hereafter "BLE"), for example. The locational information transmission device 2301a transmits, toward a predetermined field, a radio wave including a radio wave ID "SP1001-2" as identification information unique to the locational information transmission device 2301a. In addition, the sound wave ID (first identification information) and the radio wave ID (second identification information) may be different identification information or the same identification information.

In the same manner, the locational information transmission device 2301b transmits, toward a predetermined field, a sound wave including a sound wave ID "SP1002-1" and a radio wave including a radio wave ID "SP1002-2." Further, the locational information transmission device 2301c transmits, toward a predetermined field, a sound wave including a sound wave ID "SP1003-1" and a radio wave including a radio wave ID "SP1003-2." FIG. 2A is a diagram showing fields formed by of locational information transmission devices 2301a to 2301c.

FIG. 2A shows the building 2303 in FIG. 1 viewed from above. In FIGS. 24A and 24B, the radio wave transmitting unit of the locational information transmission device 2301a is assumed to transmit, toward a field 2401a, a radio wave including the radio wave ID "SP1001-2" of the locational information transmission device 2301a at first time intervals (10 second intervals, for example). Further, the sound wave transmitting unit of the locational information transmission device 2301a is assumed to transmit, toward a field 2402a, a sound wave including the sound wave ID "SP1001-1" of the locational information transmission device 2301a at second time intervals (one second intervals, for example) shorter than the first time intervals.

In the same manner, a radio wave transmitting unit of the locational information transmission device 2301b is assumed to transmit, toward a field 2401b, a radio wave including the radio wave ID "SP1002-2" and a sound wave transmitting unit thereof is assumed to transmit, toward a field 2402b, a sound wave including the sound wave ID "SP1002-1." Further, a radio wave transmitting unit of the locational information transmission device 2301c is assumed to transmit, toward a field 2401c, a radio wave including the radio wave ID "SP1003-2" and a sound wave transmitting unit thereof is assumed to transmit, toward a field 2402c, a sound wave including the sound wave ID "SP1003-1."

Returning to FIG. 1, the system configuration of the locational information transmission system 2310 is further described.

The location management server 110 is an information processing device such as a Personal Computer (PC) connected to a network 102 such as the Internet or a Local Area Network (LAN). The location management server 110 executes an application program (hereafter "app") for the location management server 110 supported in the locational information transmission system 2310. In addition, the location management server 110 may be configured with a plurality of information processing devices.

The location management server 110 can communicate with the locational information transmission devices 2301a, 2301b, and 2301c via the network 102 and predetermined radio communication. The location management server 110 manages information about locations where the locational information transmission devices 2301a, 2301b, and 2301c are disposed and locational information that indicates a location of the mobile information terminal 170. Further, the location management server 110 controls a sound wave ID and a radio wave ID that each locational information transmission device 2301 transmits, a method of transmitting sound waves, a method of transmitting radio waves, and the like.

The PAN transmitter/receiver 120 is connected to the location management server 110 via the network 102 and forms a radio network together with the locational information transmission devices 2301a, 2301b, and 2301c. The PAN transmitter/receiver 120 transfers (relays) data between the location management server 110 and the locational information transmission devices 2301a, 2301b, and 2301c connected to the radio network provided by the PAN transmitter/receiver 120.

The mobile information terminal 170 is an information terminal such as a smartphone, a mobile phone, a tablet terminal, or the like owned by a user 2302 of the locational information transmission system 2310. The mobile information terminal 170 can connect to the network 102 in radio communication and communicate with the location management server 110. Further, the mobile information terminal 170 executes an app for the mobile information terminal 170 supported in the locational information transmission system 2310.

By executing the app for the mobile information terminal 170, the mobile information terminal 170 uses a built-in microphone or the like to obtain a sound wave transmitted by the locational information transmission device 2301 and extracts a sound wave ID included in the obtained sound wave.

Further, the mobile information terminal 170 also uses a built-in radio receiving unit or the like to receive a radio wave transmitted by the locational information transmission device 2301 and extracts a radio wave ID included in the received radio wave.

Further, the app for the mobile information terminal 170 has identification information unique to each app (hereafter "app ID") installed on the mobile information terminal 170. When the mobile information terminal 170 executes the app and extracts the sound wave ID or the radio wave ID of the locational information transmission device 2301, the mobile information terminal 170 transmits obtained information including the extracted sound wave ID or radio wave ID and an app ID of the app to the location management server 110.

The app ID is an example of identification information to identify the mobile information terminal 170. By using the app ID, the locational information transmission system 2310 can identify the mobile information terminal 170 without using personal information such as a telephone number or a mail address. However, this is only an example and the mobile information terminal 170 may use identification information of the mobile information terminal 170 (terminal ID), identification information of a user (user ID), or the like instead of the app ID.

In the above locational information transmission system 2310, the location management server 110 manages locations of the locational information transmission devices 2301a, 2301b, and 2301c and also manages a sound wave ID and a radio wave ID output by each locational information transmission device 2301.

Further, from the mobile information terminal 170, the location management server 110 receives obtained information including a radio wave ID or a sound wave ID obtained by the mobile information terminal 170. The location management server 110 controls the method of transmitting radio waves and the method of transmitting sound waves of the locational information transmission device 2301 based on the radio wave ID or the sound wave ID included in the received obtained information.

With reference to FIG. 2A, the locational information transmission device 2301a is assumed to transmit a radio wave including a radio wave ID toward the field 2401a having a relatively wide area (within a radius of 2.5 to 50 m, for example) in BLE communication, for example. Further, in the locational information transmission device 2301a, transmission intervals of radio waves are assumed to be set long (10 second intervals, for example) in terms of power consumption or the like. Without modification, the mobile information terminal 170 in the field 2401a where only a radio wave of the locational information transmission device 2301a can be received can obtain the radio wave ID (example of locational information) only once per 10 seconds.

By contrast, the locational information transmission device 2301a is assumed to transmit a sound wave including a sound wave ID toward the field 2402a having a narrower field than the field for radio waves at time intervals (one second intervals, for example) shorter than the transmission intervals of radio waves. In accordance with this, if the mobile information terminal 170 is in the field 2402a, the mobile information terminal 170 can obtain the sound wave ID (example of locational information) once per one second. However, the field 2402a where sound waves can be obtained is narrower than the field 2401a where radio waves can be obtained. Accordingly, if installation intervals of the locational information transmission devices 2301a, 2301b, and 2301c, are distant, fields where sound wave IDs can be obtained will not be continuous.

Accordingly, the locational information transmission system 2310 according to the present embodiment controls the method of transmitting radio waves and the method of transmitting sound waves of the locational information transmission device 2301 based on the obtained information that includes the radio wave ID or the sound wave ID obtained by the mobile information terminal 170.

For example, in FIG. 2A, the mobile information terminal 170 is assumed to be in a location where only radio waves transmitted by the locational information transmission device 2301a can be received. In this case, obtained information transmitted from the mobile information terminal 170 to the location management server 110 includes only the radio wave ID "SP1001-2" of the locational information transmission device 2301a. In such a case, the location management server 110 causes the locational information transmission device 2301a to change the transmission intervals of radio waves to be short (one second intervals, for example). In accordance with this, even if the mobile information terminal 170 is in the location where only radio waves transmitted by the locational information transmission device 2301a can be received, the mobile information terminal 170 can obtain a radio wave ID at one second intervals.

In another example, if the obtained information includes only the radio wave ID "SP1001-2"of the locational information transmission device 2301a, the location management server 110 causes the locational information transmission device 2301a to change an output level of sound waves to be higher (+6 dB, for example). In accordance with this, the field 2402a of sound waves transmitted by the locational information transmission device 2301a is expanded as shown in FIG. 2B, so that it is possible to increase the likelihood for the mobile information terminal 170 to receive the sound wave ID.

In addition, if there is no report of the obtained information from the mobile information terminal 170 that received the radio wave ID and the sound wave ID of the locational information transmission device 2301a, the location management server 110 preferably returns the transmission intervals of radio waves and the output level of sound waves to default values after a predetermined time has elapsed, for example.

In this manner, the locational information transmission system 2310 according to the present embodiment controls the method of transmitting the sound wave ID or the radio wave ID of the locational information transmission device 2301 based on obtained information received from the mobile information terminal 170. Accordingly, in the locational information transmission system 2310 where locational information is transmitted to the mobile information terminal 170 indoors, it is possible to improve accuracy of the locational information to be reported to the mobile information terminal 170.

In addition, the transmission intervals of radio waves and the output level of sound waves above are examples of the method of transmitting radio waves or the method of transmitting sound waves controlled by the locational information transmission system 2310. For example, the locational information transmission system 2310 may control an output level of radio waves, a center frequency of sound waves, or a number of sound waves.

<Hardware Configuration>

(Hardware Configuration of Locational Information Transmission Device)

FIG. 3 is a diagram showing a hardware configuration of a locational information transmission device according to the embodiment. The locational information transmission device 2301 includes a Central Processing Unit (CPU) 2501, a Random Access Memory (RAM) 2502, a flash Read Only Memory (ROM) 2503, a radio communication unit 2504, a sound process unit 2505, an amplifier unit 2506, a loudspeaker unit 2507, a short-range radio communication unit 2508, and a microphone unit 2509, for example.

The CPU 2501 is an arithmetic unit that implements functions of the locational information transmission device 2301 by executing a program for the locational information transmission device 2301 stored in the flash ROM 2503 or the like. The RAM 2502 is a volatile memory used as a work area of the CPU 2501. The flash ROM 2503 is a non-volatile memory that stores various types of information such as the program for the locational information transmission device 2301, the radio wave ID, and the sound wave ID.

The radio communication unit 2504 is a radio communication device that performs predetermined radio communication with the PAN transmitter/receiver 120. The radio communication unit 2504 includes a transmission/reception circuit, an antenna, and a control circuit, for example. The radio communication unit 2504 may use a radio unit of various types of radio communication methods such as a wireless LAN, Zigbee (registered trademark), or specified low power radio (IEEE 802.15.4g) in the 920 MHz band.

In the following, specified low power in the 920 MHz band is used. While a transmission rate of this radio method is as low as 200 Kbps in contrast with other radio methods such as a wireless LAN using the 2.4 MHz band and Zigbee, this radio method can transmit data up to several hundred meters with current consumption of about several tens of mA. In accordance with this radio method, it is possible to transmit and receive data in a single hop and in a power-saving manner while Zigbee performs radio communication to a gateway in multiple hops. In addition, the specified low power radio in the 920 MHz band and the multi-hop communication in Zigbee or the like is an example of predetermined radio communication by the radio communication unit 2504. The predetermined radio communication may use another radio communication method.

The sound process unit 2505 performs, in accordance with control of the CPU 2501, various types of sound processes such as creating a sound wave including a sound wave ID, extracting the sound wave ID included in the sound wave obtained by the microphone unit 2509, and measuring a noise level.

Preferably, the sound process unit 2505 uses, in accordance with control of the CPU 2501, a high frequency of 16 kHz or more in an audio frequency band, for example, to create a sound wave including a sound wave ID. Directivity of sound waves becomes higher in higher frequencies. A frequency of 16 kHz or more is inaudible to humans, so that such a frequency is suitable for transmitting information such as a sound wave ID.

In addition, although a specific data transfer method using a sound wave is not limited in particular in this embodiment, it is possible to apply a known modulation such as Frequency Shift Keying (FSK) or Phase Shift Keying (PSK) to a sound wave of a predetermined frequency and transmit information.

Alternatively, the data transfer method using a sound wave may represent a digital value of "1"/"0" by switching on/off a sound wave of a predetermined frequency (19 kHz, for example). In this case, the mobile information terminal 170 upon receiving the sound wave can obtain information included in the sound wave by determining presence or absence of a frequency determined in advance with a predetermined sampling rate.

In addition, the sound process unit 2505 may be implemented by a semiconductor integrated circuit for a sound process or may be implemented by a Digital Signal Processor (DSP) or the like. Alternatively, the sound process unit 2505 may be implemented by a program executed by the CPU 2501.

The amplifier unit 2506 is an amplifying device that amplifies a sound wave signal to be output to the loudspeaker unit 2507. The amplifier unit 2506 can change, in accordance with control of the CPU 2501, an output level (volume, sound pressure, or the like) of a sound wave signal to be output to the loudspeaker unit 2507.

The loudspeaker unit 2507 is a sound wave generation device that converts a sound wave signal including a sound wave ID output from the amplifier unit 2506 to a sound wave and outputs the sound wave.

The short-range radio communication unit 2508 is a radio transmission (communication) device that sends (transmits) a radio wave including a radio wave ID of the locational information transmission device 2301.

Preferably, the short-range radio communication unit 2508 transmits a radio wave including a radio wave ID in short-range radio communication such as BLE that enables communication with the general-purpose mobile information terminal 170. In addition, a travelling distance of radio waves transmitted by the short-range radio communication unit 2508 is within about 2.5 to 50 m in a case of BLE communication, for example. In addition, BLE is an example of a radio method for transmitting radio waves including a radio wave ID. The short-range radio communication unit 2508 may transmit a radio wave including a radio wave ID in another communication method.

The microphone unit 2509 includes a sound collection element such as a microphone. The microphone unit 2509 converts a sound wave obtained by the microphone or the like to a sound wave signal.

(Hardware Configuration of Location Management Server)

Figure 4:
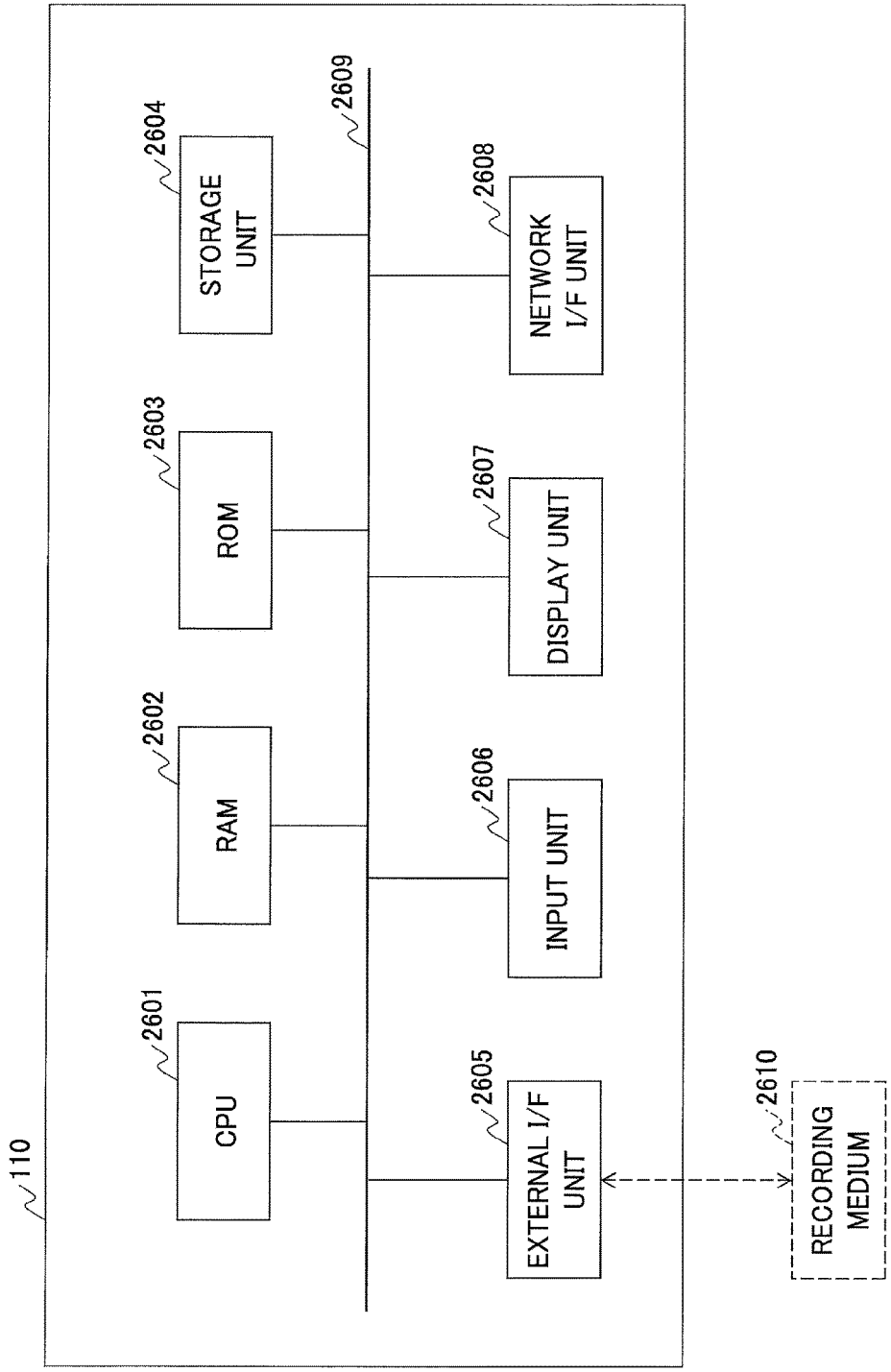
FIG. 4 is a diagram showing a hardware configuration of a location management server according to the embodiment.

FIG. 4 is a diagram showing a hardware configuration of a location management server according to the embodiment. The location management server 110 has a configuration of a typical computer. The location management server 110 includes a CPU 2601, a RAM 2602, a ROM 2603, a storage unit 2604, an external I/F unit 2605, an input unit 2606, a display unit 2607, a network I/F unit 2608, a bus 2609, and the like.

The CPU 2601 is an arithmetic unit that implements functions of the location management server 110 by reading, on the RAM 2602, a program or data stored in the ROM 2603, the storage unit 2604, or the like and performing a process. The RAM 2602 is a volatile memory used as a work area of the CPU 2601. The ROM 2603 is a non-volatile memory that can maintain a program or data even in a powered-off state.

The storage unit 2604 is a storage device such as a Hard Disk Drive (HDD) or a Solid State Drive (SSD). The storage unit 2604 stores an Operation System (OS), an application program, various types of data, and the like.

The external I/F unit 2605 is an interface for an external device. Examples of the external device include a recording medium 2610, and the like. The location management server 110 can read and/or write on the recording medium 2610 via the external I/F unit 2605. Examples of the recording medium 2610 include an optical disk, a magnetic disk, a memory card, and a Universal Serial Bus (USB) memory. Further, if a predetermined program is stored in the recording medium 2610 and the program stored in the recording medium 2610 is installed in the location management server 110 via the external I/F unit 2605, the location management server 110 can execute the predetermined program.

The input unit 2606 is an input device such as a pointing device including a mouse, a keyboard, or the like which is used to input operation signals to the location management server 110. The display unit 2607 is a display device such as a display screen which displays a result of a process performed by the location management server 110.

The network I/F unit 2608 is a communication interface for a wired/wireless LAN, for example, to connect the location management server 110 to the network 102. The location management server 110 can perform data communication with another device via the network I/F unit 2608. The bus 2609 is connected to each of the above constituent elements and transfers an address signal, a data signal, various types of control signals, and the like.

(Hardware Configuration of Information Terminal)

Figure 5:
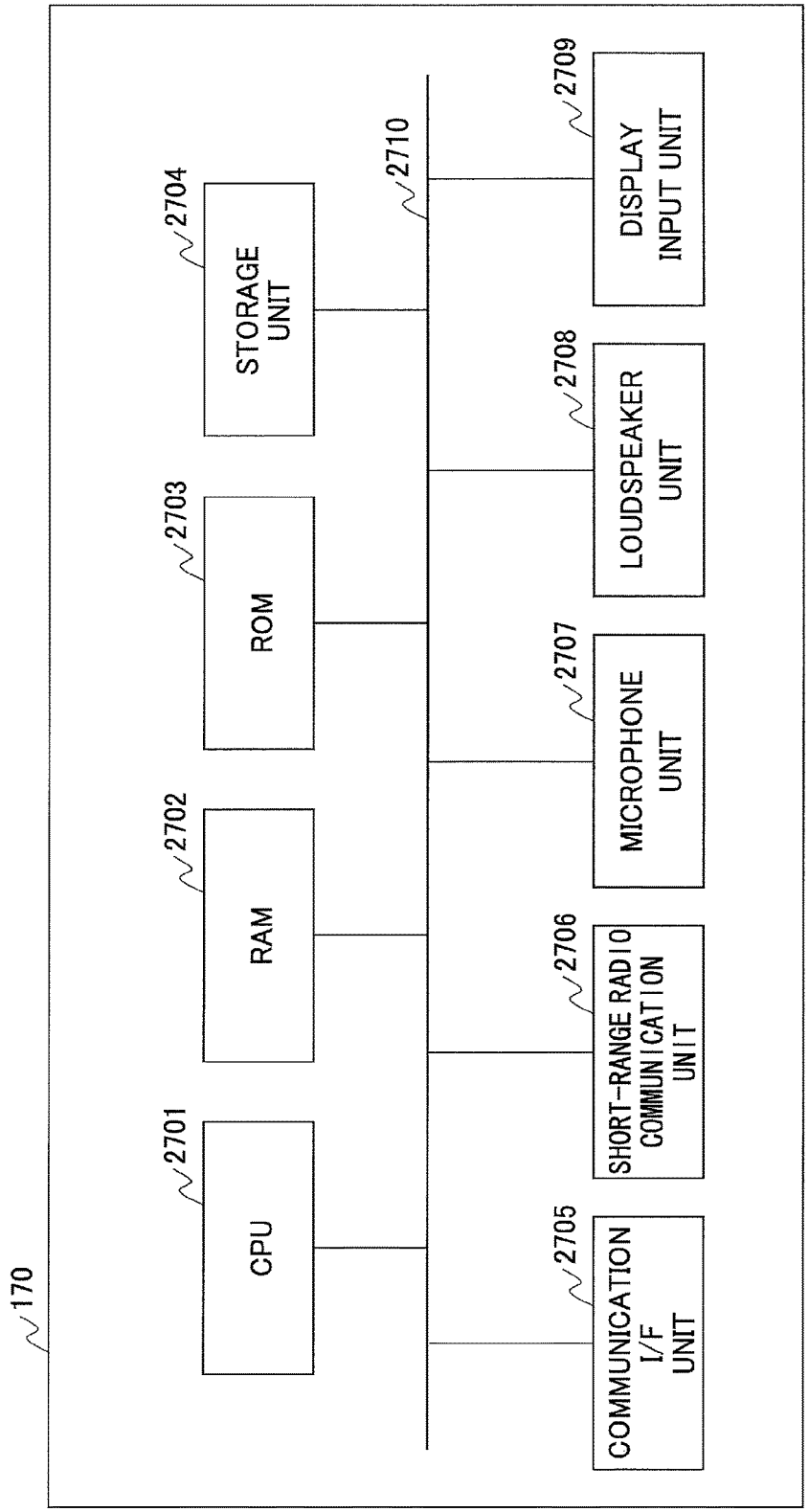
FIG. 5 is a diagram showing a hardware configuration of a mobile information terminal according to the embodiment.

FIG. 5 is a diagram showing a hardware configuration of a mobile information terminal according to the embodiment. The mobile information terminal 170 has a configuration of a typical computer. The mobile information terminal 170 includes a CPU 2701, a RAM 2702, a ROM 2703, a storage unit 2704, a communication I/F unit 2705, a short-range radio communication unit 2706, a microphone unit 2707, a loudspeaker unit 2708, a display input unit 2709, a bus 2710, and the like.

The CPU 2701 is an arithmetic unit that implements functions of the mobile information terminal 170 by reading, on the RAM 2702, a program or data stored in the ROM 2703, the storage unit 2704, or the like and performing a process. The RAM 2702 is a volatile memory used as a work area of the CPU 2701. The ROM 2703 is a non-volatile memory that can maintain a program or data even in a powered-off state.

The storage unit 2704 is a storage device such as a HDD, an SSD, or a flash ROM. The storage unit 2704 stores an OS, an application program, various types of data, and the like.

The communication I/F unit 2705 is a communication interface compliant with a communication method for a mobile communication network such as 3rd Generation (3G), Long Term Evolution (LTE), a wireless LAN, and the like. The mobile information terminal 170 connects to the network 102 via the communication I/F unit 2705 and performs data communication with the location management server 110.

The short-range radio communication unit 2706 is a radio reception (communication) device that receives a radio wave including a radio wave ID output by the locational information transmission device 2301. With the same radio communication method (such as BLE) as in the short-range radio communication unit 2508 of the locational information transmission device 2301, the short-range radio communication unit 2706 receives a radio wave transmitted by the locational information transmission device 2301. In addition, BLE is an example of a radio method for transmitting radio waves including a radio wave ID, but BLE does not limit the scope of the present invention.

The microphone unit 2707 is a sound collection device including a sound collection element such as a microphone. The microphone unit 2707 converts a sound wave obtained by the microphone or the like to a sound wave signal and further converts it to sound wave data in a predetermined format where necessary. A microphone included in smartphones of recent years can detect a sound wave of 20 kHz or up to about 24 kHz in a more preferable example. Accordingly, the microphone unit 2707 can preferably obtain a sound wave ID included in a sound wave output by the locational information transmission device 2301, the sound wave ID being converted to a high frequency of 16 kHz or more, for example.

The loudspeaker unit 2708 includes a sound wave output element such as a loudspeaker. The loudspeaker unit 2708 converts a sound wave signal to a sound wave and outputs the sound wave by the loudspeaker.

The display input unit 2709 includes a display element such as a Liquid Crystal Display (LCD) and an element for input such as a touch panel. The display input unit 2709 receives an input operation by a user and renders a display screen by a program executed in the mobile information terminal 170.

The bus 2710 is connected to each of the above constituent elements and transfers an address signal, a data signal, various types of control signals, and the like.

<Functional Configuration>

(Functional Configuration of Locational Information Transmission Device)

Figure 6:
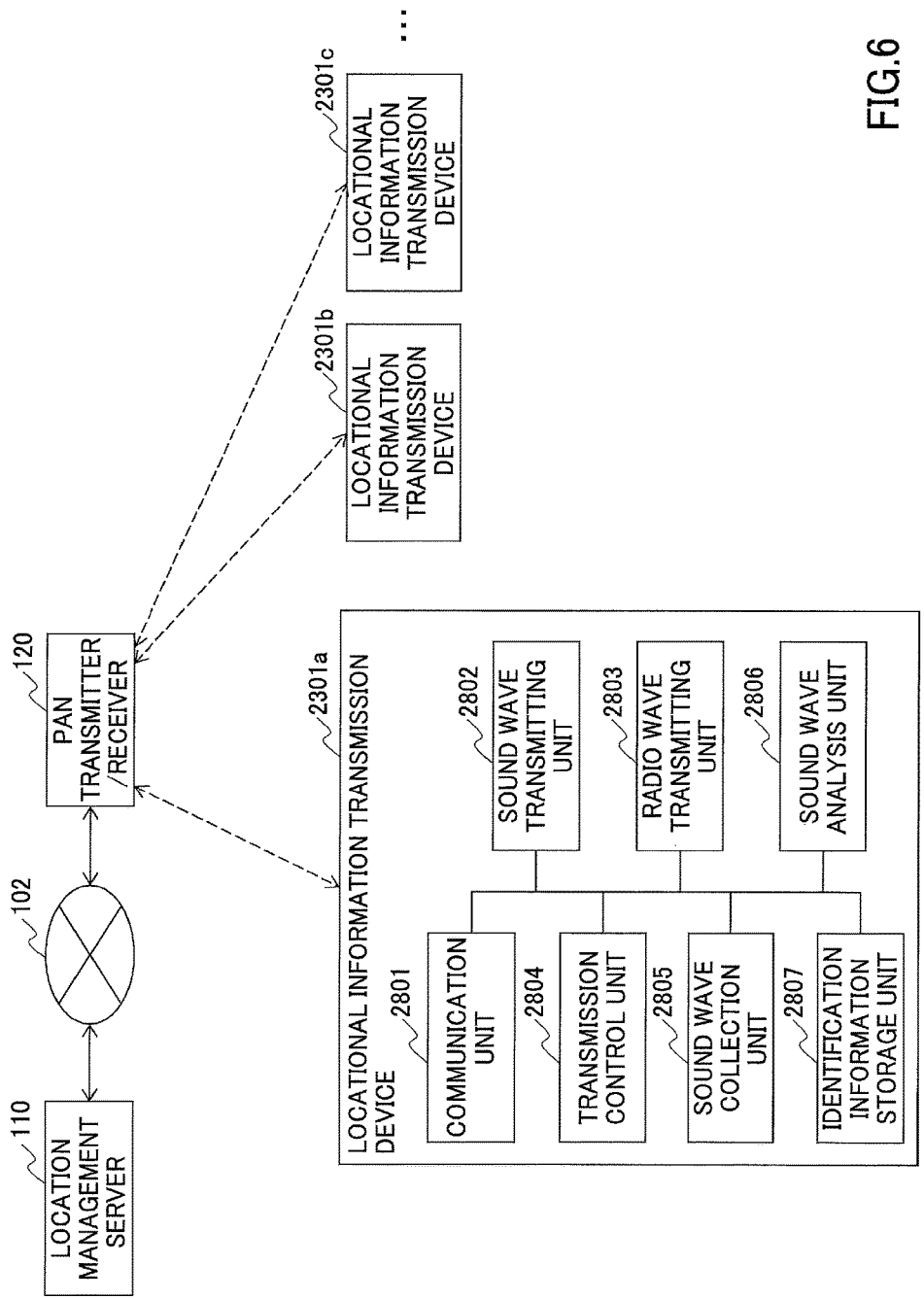
FIG. 6 is a diagram showing a functional configuration of a locational information transmission device according to the embodiment.

FIG. 6 is a diagram showing a functional configuration of a locational information transmission device according to the embodiment. In the following description, a radio network provided by the PAN transmitter/receiver 120 is assumed to use specified low power radio in the 920 MHz band described above. In addition, this is only an example and the radio network provided by the PAN transmitter/receiver 120 may use multi-hop communication.

The locational information transmission device 2301 includes a communication unit 2801, a sound wave transmitting unit 2802, a radio wave transmitting unit 2803, a transmission control unit 2804, a sound wave collection unit 2805, a sound wave analysis unit 2806, an identification information storage unit 2807, and the like.

The communication unit (radio communication unit) 2801 performs predetermined radio communication in a radio network provided by the PAN transmitter/receiver 120. The communication unit 2801 is implemented by the radio communication unit 2504 shown in FIG. 3 and a program executed by the CPU 2501 shown in FIG. 3, for example. In FIG. 6, each locational information transmission device 2301 is capable of communicating with the location management server 110 via the PAN transmitter/receiver 120 and predetermined radio communication.

For example, if the location management server 110 simultaneously transmits (broadcasting) predetermined information, the predetermined information is transmitted to each locational information transmission device 2301 via the PAN transmitter/receiver 120. The locational information transmission device 2301 receives the predetermined information via the communication unit 2801 and obtains necessary information (such as identification information of the own device or information corresponding to address information). Further, each locational information transmission device 2301 can transmit predetermined information using the communication unit 2801 to the location management server 110 via the PAN transmitter/receiver 120.

The sound wave transmitting unit (sound wave transmitting unit) 2802 transmits a sound wave including a sound wave ID (first identification information) of the locational information transmission device 2301. The sound wave transmitting unit 2802 is implemented by the loudspeaker unit 2507, the amplifier unit 2506, the sound process unit 2505 shown in FIG. 3, and a program executed by the CPU 2501 shown in FIG. 3, for example.

The radio wave transmitting unit (radio wave transmitting unit) 2803 transmits a radio wave including a radio wave ID (second identification information) of the locational information transmission device 2301. The radio wave transmitting unit 2803 is implemented by the short-range radio communication unit 2508 shown in FIG. 3 and a program executed by the CPU 2501 shown in FIG. 3, for example.

The transmission control unit (transmission control unit) 2804 changes a method of transmitting sound waves or a method of transmitting radio waves in response to control information reported by the communication unit 2801 via predetermined radio communication (such as a radio network provided by the PAN transmitter/receiver 120).

For example, the sound wave transmitting unit 2802 is assumed to transmit a sound wave including a sound wave ID at a predetermined output level. If control information to direct a change of the output level of sound waves is received from the location management server 110, the transmission control unit 2804 changes, in accordance with the direction of the control information, the output level of sound waves to be transmitted by the sound wave transmitting unit 2802. Alternatively, the radio wave transmitting unit 2803 is assumed to transmit a radio wave including a radio wave ID at predetermined time intervals. If control information to direct a change of the time intervals for transmitting radio waves is received from the location management server 110, the transmission control unit 2804 changes, in accordance with the direction of the control information, the time intervals of radio waves to be transmitted by the radio wave transmitting unit 2803. The transmission control unit 2804 is implemented by a program executed by the CPU 2501 shown in FIG. 3, for example.

The sound wave collection unit (sound wave collection unit) 2805 collects a sound wave in the vicinity of the locational information transmission device 2301. The sound wave collection unit 2805 is implemented by the microphone unit 2509 shown in FIG. 3 and a program executed by the CPU 2501 shown in FIG. 3, for example.

The sound wave analysis unit (analysis unit) 2806 analyzes a sound wave obtained by the sound wave collection unit 2805. The sound wave analysis unit 2806 is implemented by the sound process unit 2505 shown in FIG. 3 and a program executed by the CPU 2501 shown in FIG. 3, for example. The sound wave analysis unit 2806 measures a noise level in the vicinity of the locational information transmission device 2301 and extracts a sound wave ID included in a sound wave obtained by the sound wave collection unit 2805, for example. Further, the sound wave analysis unit 2806 uses the communication unit 2801 to report, to the location management server 110, the noise level in the vicinity of the locational information transmission device 2301, the sound wave ID included in the obtained sound wave, and the like which have been analyzed.

The identification information storage unit 2807 stores a radio wave ID and a sound wave ID of the locational information transmission device 2301 and the like. The identification information storage unit 2807 is implemented by the flash ROM 2503, the RAM 2502 shown in FIG. 3, and a program executed by the CPU 2501 shown in FIG. 3, for example.

(Functional Configuration of Locational Information Transmission System)

Figure 7:
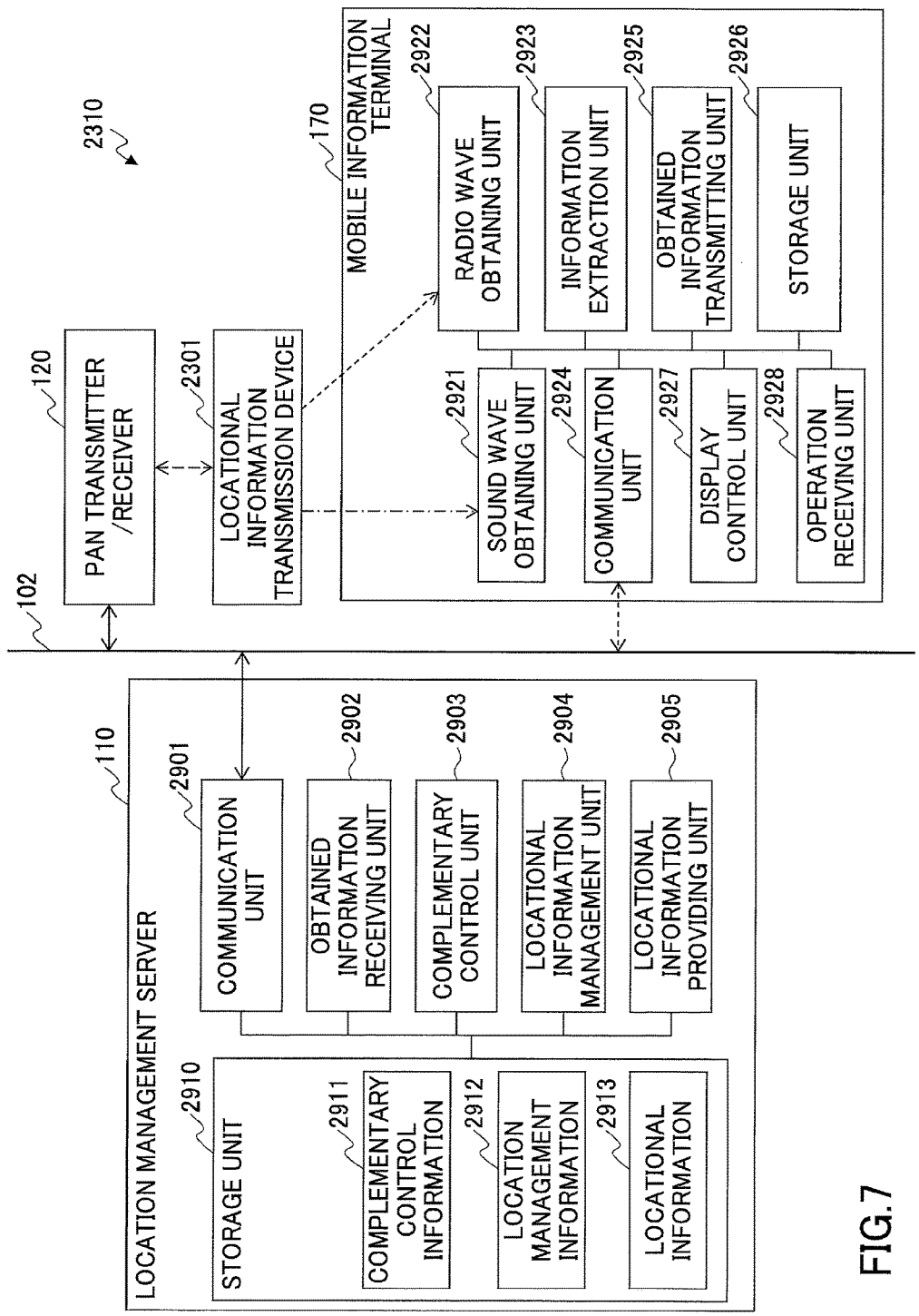
FIG. 7 is a diagram showing a functional configuration of a locational information transmission system according to the embodiment.

FIG. 7 is a diagram showing a functional configuration of a locational information transmission system according to the embodiment. The functional configuration of the locational information transmission system 2310 in FIG. 7 shows a minimum configuration of the locational information transmission device 2301, the location management server 110, the PAN transmitter/receiver 120, and the mobile information terminal 170.

(Functional Configuration of Location Management Server)

The location management server 110 includes a communication unit 2901, an obtained information receiving unit 2902, a complementary control unit 2903, a locational information management unit 2904, a locational information providing unit 2905, a storage unit 2910, and the like.

The communication unit 2901 connects the location management server 110 to the network 102 and performs communication with the PAN transmitter/receiver 120, the mobile information terminal 170, and the like. The communication unit 2901 is implemented by the network I/F unit 2608 shown in FIG. 4 and a program executed by the CPU 2601 shown in FIG. 4, for example.

The obtained information receiving unit (receiving unit) 2902 receives obtained information from the mobile information terminal 170, the obtained information including a radio wave ID or a sound wave ID received by the mobile information terminal 170 from the locational information transmission device 2301. The obtained information receiving unit 2902 is implemented by a program executed by the CPU 2601 shown in FIG. 4, for example.

The complementary control unit (complementary control unit) 2903 reports, based on the obtained information received by the obtained information receiving unit 2902, control information to control a method of transmitting sound waves or radio waves to be transmitted by the locational information transmission device 2301, to the locational information transmission device 2301 via the PAN transmitter/receiver 120. The complementary control unit 2903 is implemented by a program executed by the CPU 2601 shown in FIG. 4, for example.

The complementary control unit 2903 determines, based on the obtained information received by the obtained information receiving unit 2902 and complementary control information 2911 stored in the storage unit 2910, for example, control contents to control the method of transmitting sound waves or radio waves to be transmitted by the locational information transmission device 2301.

FIG. 8A and FIG. 8B are diagrams showing complementary control information according to the embodiment.

FIG. 8A shows an example of the complementary control information 2911. In FIG. 8A, the complementary control information 2911 includes a "control item," a "sound wave ID," a "radio wave ID," a "default value," a "changed value," and the like.

The "control item" indicates contents to control the control information. For example, "transmission intervals of radio waves" indicates control such that the locational information transmission device 2301 changes transmission intervals to transmit a radio wave including a radio wave ID. Further, an "output level of radio waves" indicates control such that the locational information transmission device 2301 changes an output level for transmitting a radio wave including a radio wave ID.

The "sound wave ID" and the "radio wave ID" indicate presence or absence of a sound wave ID and a radio wave ID included in the obtained information. For example, "yes" in the sound wave ID indicates that a sound wave ID is included in the obtained information and "no" in the sound wave ID indicates that a sound wave ID is not included in the obtained information. In the same manner, "yes" in the radio wave ID indicates that a radio wave ID is included in the obtained information and "no" in the radio wave ID indicates that a radio wave ID is not included in the obtained information.

The "default value" indicates a default value of each control item. For example, a default value of the control item "transmission intervals of radio waves" is "once per 10 seconds". This indicates that if control information is not transmitted, the locational information transmission device 2301 transmits a radio wave once per 10 seconds.

The "changed value" indicates changed contents of each control item that match a combination of the "sound wave ID" and the "radio wave ID." For example, in the control item "transmission intervals of radio waves," if obtained information results in "no" in the sound wave ID and "yes" in the radio wave ID, this indicates that the transmission intervals of radio waves are changed to "once per 1 second" which is shorter than the default value. Further, "–" in the changed value indicates that there is no change.

Further, "plural" in the sound wave ID for the control item "output level of radio waves" indicates that a plurality of radio wave IDs are included in obtained information received by the obtained information receiving unit 2902. In such a case, it is difficult to identify a location of the mobile information terminal 170. Accordingly, it is preferable to lower an output level of radio waves in neighboring locational information transmission devices 2301, for example.

FIG. 8B shows another example of the complementary control information 2911. As shown in FIG. 8B, the complementary control information 2911 may further include various types of control items.

For example, the "output level of sound waves" indicates control such that the locational information transmission device 2301 changes an output level for transmitting a sound wave including a sound wave ID. The "frequency of sound waves" indicates control to change a center frequency of sound waves to be transmitted by the locational information transmission device 2301. The "number of sound waves" indicates control to change a number of sound waves to be transmitted by the locational information transmission device 2301.

Further, as shown in FIG. 8B, the complementary control information 2911 may have "priority" information. For example, FIG. 8B has a plurality of control items (such as the "transmission intervals of radio waves," the "output level of sound waves," the "frequency of sound waves," and the "number of sound waves") for "no" in the sound wave ID and "yes" in the radio wave ID. In such a case, it is preferable that the complementary control unit 2903 performs the control items successively from higher (smaller numerical value) "priority."

For example, in the case of "no" in the sound wave ID and "yes" in the radio wave ID, the complementary control unit 2903 changes the "transmission intervals of radio waves" with priority "1" to "once per 1 second." Further, if the status of "no" in the sound wave ID and "yes" in the radio wave ID continues after the change, the complementary control unit 2903 raises the "output level of sound waves" with priority "2" by "6 dB." Further, if the status of "no" in the sound wave ID and "yes" in the radio wave ID continues after the change, the complementary control unit 2903 changes the "frequency of sound waves" with priority "3" from "f1 (20 kHz, for example)" to "f2 (17 kHz, for example)."

In addition, the determination of control contents by the complementary control unit 2903 using the complementary control information 2911 shown in FIG. 8A and FIG. 8B is only an example. The complementary control unit 2903 may determine control contents based on the radio wave ID and the sound wave ID included in the obtained information without using the complementary control information 2911.

Returning to FIG. 7, the description of the functional configuration of the location management server 110 continues.

The locational information management unit 2904 (management unit) manages location management information 2912 in which identification information (radio wave ID, sound wave ID, and the like) about the locational information transmission device 2301 and information (such as coordinate information) indicating a location where the locational information transmission device 2301 is disposed are associated and stored. Further, the location management server 110 manages locational information 2913 about the mobile information terminal 170 based on the obtained information received from the mobile information terminal 170 and the location management information 2912. The locational information management unit 2904 is implemented by a program executed by the CPU 2601 shown in FIG. 4, for example.

FIG. 9A, FIG. 9B, and FIG. 9C are diagrams showing information managed by a locational information management unit according to the embodiment. FIG. 9A shows an example of the location management information 2912. The location management information 2912 includes a "transmission device ID," a "sound wave ID," a "radio wave ID," "location coordinates," "description of location," and the like.

The "transmission device ID" identifies the locational information transmission device 2301. The location management server 110 uses the transmission device ID to transmit various control information items to the locational information transmission device 2301. For example, the location management server 110 simultaneously transmits control information including the transmission device ID to a plurality of the locational information transmission devices 2301 and the locational information transmission devices 2301 obtain only such control information as includes the transmission device ID of the own device. Alternatively, the location management server 110 may store the transmission device ID in association with address information and transmit control information to an address that corresponds to the transmission device ID.

The "sound wave ID" is a sound wave ID to be included in a sound wave and transmitted by the locational information transmission device 2301. The "radio wave ID" is a radio wave ID to be included in a radio wave and transmitted by the locational information transmission device 2301. The "sound wave ID" and the "radio wave ID" are unique to each locational information transmission device 2301, so that it is possible to identify the locational information transmission device 2301 based on the "sound wave ID" or the "radio wave ID." In addition, although the "sound wave ID" and the "radio wave ID" have the same value, they are assumed to have different values for ease of description.

The "location coordinates" are an example of information indicating a location where each locational information transmission device 2301 is disposed. The "location coordinates" may be field information or the like to identify each of a plurality of divided field on the floor.

In the "description of location," related information such as a description of location coordinates, a timetable, store information, a store URL, a distance to transportation, and the like is stored.

FIG. 9B is another example of the location management information 2912. In the example of FIG. 9B, a "loudspeaker ID" is stored instead of the "sound wave ID" and the "radio wave ID" in the location management information 2912 shown in FIG. 9A. In this case, the locational information transmission device 2301 transmits a sound wave and a radio wave including the same loudspeaker ID, for example. Alternatively, the locational information transmission device 2301 may add information (such as "−1" and "−2") to an end of the loudspeaker ID and transmit a sound wave and a radio wave.

FIG. 9C is an example of the locational information 2913 about the mobile information terminal 170. The locational information management unit 2904 uses a sound wave ID or a radio wave ID included in the obtained information received by the obtained information receiving unit 2902 and the location management information 2912 in order to identify location coordinates of the mobile information terminal 170. The locational information management unit 2904 saves and manages the location coordinates in the locational information 2913.

An "app ID" is an example of identification information to identify the mobile information terminal 170.

A "sound wave ID" and a "radio wave ID" are a sound wave ID and a radio wave ID included in the obtained information received from the mobile information terminal 170. For example, in FIG. 9C, the mobile information terminal 170 with the app ID "AP001" obtained only the radio wave ID "SP1001-2"from the locational information transmission device 2301 but could not obtain a sound wave ID. Further, another mobile information terminal 170 with the app ID "AP002" was able to obtain both of the sound wave ID "SP1002-1" and the radio wave ID "SP1002-2" from the locational information transmission device 2301. Further, another mobile information terminal 170 with the app ID "AP003" obtained a few radio wave IDs "SP1002-2" and "SP1003-2" but could not obtain a sound wave ID.

A "date and time of acquisition" indicates a date and time when the location management server 110 received obtained information from the mobile information terminal 170 or a date and time when the mobile information terminal 170 obtained a sound wave ID, a radio wave ID, or the like.

The "transmission device ID" and the "location coordinates" indicate identification information about the locational information transmission device 2301 corresponding to the sound wave ID or the radio wave ID identified by the locational information management unit 2904 based on the location management information 2912 and a location where the locational information transmission device 2301 is disposed.

The location management server 110 can identify the location of the mobile information terminal 170 by using the locational information 2913 about the mobile information terminal 170. Further, the location management server 110 can identify the sound wave ID or the radio wave ID obtained by each mobile information terminal 170 by using the locational information 2913.

Returning to FIG. 7 again, the description of the functional configuration of the location management server 110 continues.

The locational information providing unit 2905 provides locational information to the mobile information terminal 170 by using the locational information 2913 about the mobile information terminal 170. The locational information providing unit 2905 is implemented by a program executed by the CPU 2601 shown in FIG. 4, for example.

The storage unit 2910 stores the complementary control information 2911, the location management information 2912, and the locational information 2913. The storage unit 2910 is implemented by the storage unit 2604 and the RAM 2602 shown in FIG. 4 and a program executed by the CPU 2601 shown in FIG. 4, for example.

(Functional Configuration of Mobile Information Terminal)

The mobile information terminal 170 includes a sound wave obtaining unit 2921, a radio wave obtaining unit 2922, an information extraction unit 2923, a communication unit 2924, an obtained information transmitting unit 2925, a storage unit 2926, a display control unit 2927, an operation receiving unit 2928, and the like.

The sound wave obtaining unit 2921 obtains a sound wave including a sound wave ID transmitted by the locational information transmission device 2301. The sound wave obtaining unit 2921 is implemented by the microphone unit 2707 shown in FIG. 5 and a program executed by the CPU 2701 shown in FIG. 5, for example.

The radio wave obtaining unit 2922 obtains a radio wave including a radio wave ID transmitted by the locational information transmission device 2301. The radio wave obtaining unit 2922 is implemented by the short-range radio communication unit 2706 shown in FIG. 5 and a program executed by the CPU 2701 shown in FIG. 5, for example.

The information extraction unit 2923 extracts a sound wave ID included in a sound wave obtained by the sound wave obtaining unit 2921. Further, the information extraction unit 2923 extracts a radio wave ID included in a radio wave obtained by the radio wave obtaining unit 2922. The information extraction unit 2923 is implemented by a program executed by the CPU 2701 shown in FIG. 5, for example.

The communication unit 2924 connects the mobile information terminal 170 to the network 102 and enables communication with the location management server 110, for example. The communication unit 2924 is implemented by the communication I/F unit 2705 shown in FIG. 5 and a program executed by the CPU 2701 shown in FIG. 5, for example.

If the information extraction unit 2923 extracts a sound wave ID or a radio wave ID, the obtained information transmitting unit 2925 transmits obtained information including the extracted sound wave ID or the extracted sound wave ID and an app ID which serves as identification information of the own device to the location management server 110. The obtained information transmitting unit 2925 is implemented by a program executed by the CPU 2701 shown in FIG. 5, for example.

The storage unit 2926 stores the app ID which serves as identification information to identify the mobile information terminal 170, for example. The storage unit 2926 is implemented the storage unit 2704 shown in FIG. 5 and a program executed by the CPU 2701 shown in FIG. 5, for example.

The display control unit 2927 causes the display input unit 2709 or the like shown in FIG. 5 to render a display screen or the like based on locational information obtained from the location management server 110, for example. The display control unit 2927 is implemented by a program executed by the CPU 2701 shown in FIG. 5, for example.

The operation receiving unit 2928 receives an operation (destination setting, for example) of a user. The operation receiving unit 2928 is implemented by the display input unit 2709 shown in FIG. 5 and a program executed by the CPU 2701 shown in FIG. 5, for example.

<Flow of Process>

(ID Setting Process)

Figure 10:
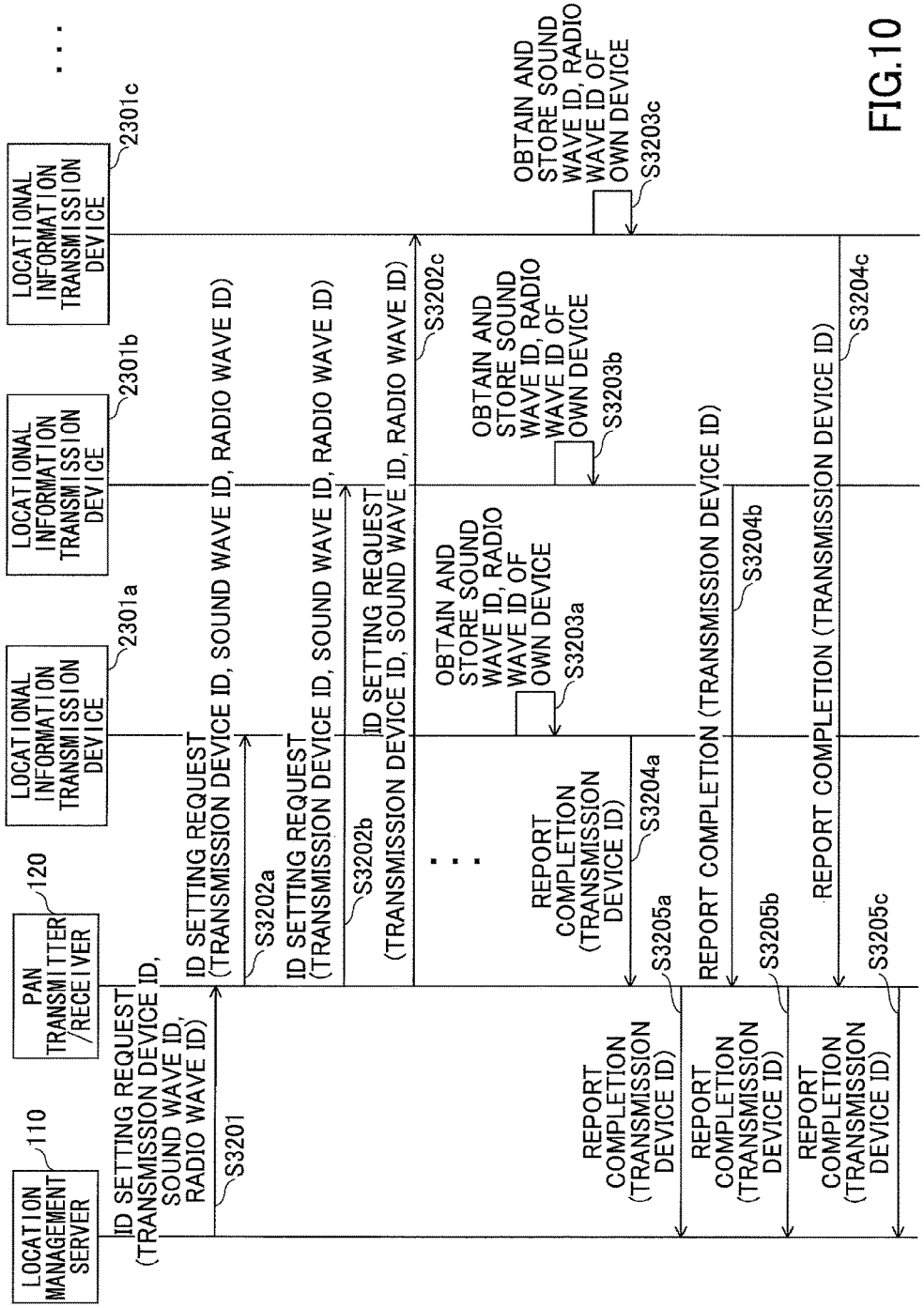
FIG. 10 is a sequence diagram showing an ID setting process according to the embodiment.

FIG. 10 is a sequence diagram showing an ID setting process according to the embodiment. This process shows an example of a process where the location management server 110 sets (changes) a radio wave ID, a sound wave ID, or the like of each locational information transmission device 2301 under the functional configuration of the locational information transmission system 2310 shown in FIG. 6 and FIG. 7, for example.

In step S3201, the locational information management unit 2904 of the location management server 110 simultaneously transmits an ID setting request to a plurality of the locational information transmission devices 2301a to 2301c via the PAN transmitter/receiver 120. This ID setting request includes information such as a plurality of "transmission device IDs" and a "sound wave ID," a "radio wave ID," or the like that corresponds to each "transmission device ID" as shown in FIG. 9A, for example.

In steps S3202a to 3202c, the ID setting request is transferred from the PAN transmitter/receiver 120 to each of the locational information transmission devices 2301a to 2301c.

In step S3203a, upon receiving the ID setting request, the locational information transmission device 2301a obtains a sound wave ID "SP1001-1" and a radio wave ID "SP1001-2" that correspond to a transmission device ID ("ID0001" for example) of the locational information transmission device 2301a and saves the sound wave ID and the radio wave ID in the storage unit 2926. In accordance with this, the transmission control unit 2804 of the locational information transmission device 2301a updates (changes) a sound wave ID included in a sound wave to be transmitted by the sound wave transmitting unit 2802 and a radio wave ID included in a radio wave to be transmitted by the radio wave transmitting unit 2803.

In steps S3204a and 3205a, the locational information transmission device 2301a sends a completion report indicating that the ID is set to the location management server 110 via the PAN transmitter/receiver 120. This completion report includes the transmission device ID of the locational information transmission device 2301a, for example, so that the location management server 110 can recognize that the setting of the ID of the locational information transmission device 2301a has been completed.

In the same manner, in step S3203b, upon receiving the ID setting request, the locational information transmission device 2301b obtains a sound wave ID and a radio wave ID that correspond to a transmission device ID of the locational information transmission device 2301b and saves the sound wave ID and the radio wave ID in the storage unit 2926. Further, in steps S3204b and 3205b, the locational information transmission device 2301b sends a completion report indicating that the ID is set to the location management server 110 via the PAN transmitter/receiver 120.

Further, in step S3203c, upon receiving the ID setting request, the locational information transmission device 2301c obtains a sound wave ID and a radio wave ID that correspond to a transmission device ID of the locational information transmission device 2301c and saves the sound wave ID and the radio wave ID in the storage unit 2926. Further, in steps S3204c and 3205c, the locational information transmission device 2301c sends a completion report indicating that the ID is set to the location management server 110 via the PAN transmitter/receiver 120.

In accordance with the above process, the location management server 110 can manage the sound wave IDs, the radio wave IDs, and the like of the locational information transmission devices 2301 in the locational information transmission system 2310.

The following describes an example of control of the method of transmitting radio waves or the method of transmitting sound waves of the locational information transmission device 2301 according to the locational information transmission system 2310.

(Example of First Control)

Figure 11:
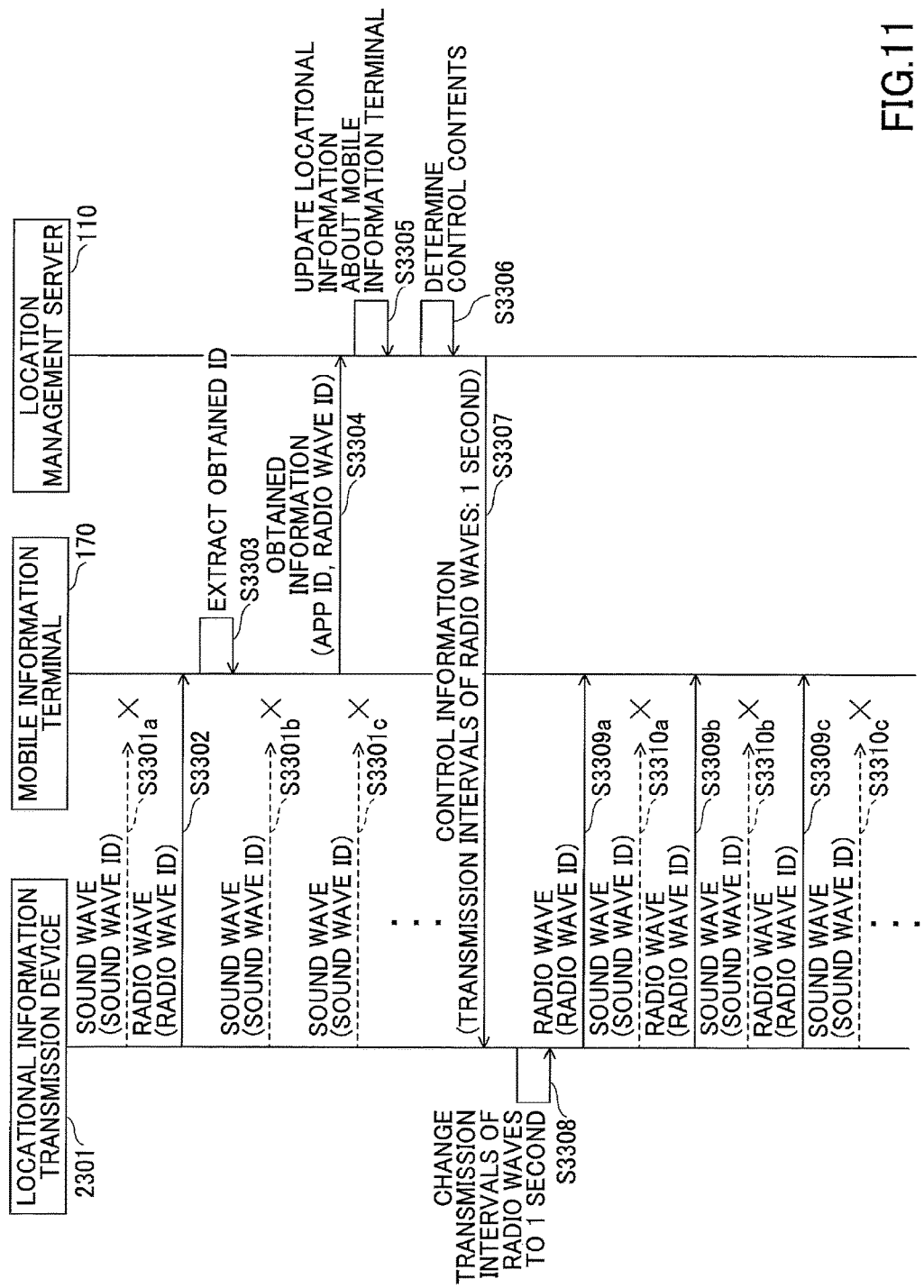
FIG. 11 is a sequence diagram (1) showing a process in a locational information transmission system according to the embodiment.

FIG. 11 is a sequence diagram (1) showing a process in the locational information transmission system according to the embodiment. This process shows an example of a process where the mobile information terminal 170 receives only the radio wave ID with respect to the sound wave ID and the radio wave ID transmitted by the locational information transmission device 2301a in FIG. 2A, for example.

In addition, the locational information transmission device 2301 here is assumed to intermittently transmit sound waves including the sound wave ID periodically at one second intervals, for example. The "one second intervals" are an example of default transmission intervals at which the locational information transmission device 2301 transmits sound waves including the sound wave ID. The transmission intervals may have other time intervals.

Further, the locational information transmission device 2301 is assumed to intermittently transmit radio waves including the radio wave ID periodically at 10 second intervals, for example. The "10 second intervals" are an example of default transmission intervals at which the locational information transmission device 2301 transmits radio waves including the radio wave ID. The "10 second intervals" may have other time intervals longer than the default transmission intervals (one second intervals here) at which the locational information transmission device 2301 transmits sound waves including the sound wave ID.

Further, at a start of the process shown in FIG. 11, it is assumed that an app supported in the locational information transmission system 2310 has been started in the mobile information terminal 170 and the mobile information terminal 170 continuously receives sound waves and radio waves transmitted by the locational information transmission device 2301.

In steps S3301a to S3301c, the sound wave transmitting unit 2802 of the locational information transmission device 2301 intermittently transmits sound waves including the sound wave ID at the default transmission intervals (one second intervals). However, it is assumed that the sound waves transmitted in steps 33301a to 33301c cannot be correctly received by the mobile information terminal 170. In addition, "x" in FIG. 11 indicates that the sound wave ID included in the transmitted sound wave is not correctly received by the mobile information terminal 170. The same also applies to the following description.

In step S3302, the radio wave transmitting unit 2803 of the locational information transmission device 2301 transmits radio waves including the radio wave ID at the default transmission intervals (10 second intervals).

In step S3303, the information extraction unit 2923 of the mobile information terminal 170 extracts IDs (radio wave ID and sound wave ID) included in the sound waves obtained by the sound wave obtaining unit 2921 and in the radio waves obtained by the radio wave obtaining unit 2922. In this case, the radio wave ID included in the radio waves received in step S3302 is extracted by the information extraction unit 2923.

In step S3304, the obtained information transmitting unit 2925 of the mobile information terminal 170 transmits, to the location management server 110, obtained information including the app ID stored in the storage unit 2926, the app ID serving as identification information of the mobile information terminal 170, and the radio wave ID extracted in step S3303.

In step S3305, the obtained information receiving unit 2902 of the location management server 110 receives the obtained information transmitted by the mobile information terminal 170. Further, the locational information management unit 2904 of the location management server 110 creates locational information about the mobile information terminal 170 based on the obtained information and updates the locational information 2913 stored in the storage unit 2910.

In this case, in the updated locational information about the mobile information terminal 170, the sound wave ID is recorded as "–" as indicated by the app ID "AP0001" in the locational information 2913 shown in FIG. 9C. FIG. 9C shows that the mobile information terminal 170 with the app ID "AP0001" could not obtain the sound wave ID and obtained only the radio wave ID "SP1001-2."

In step S3306, the complementary control unit 2903 of the location management server 110 determines control contents that match the locational information 2913 updated in step S3305. For example, it is assumed that in locational information 2913 shown in FIG. 9C, locational information about the app ID "AP0001" is updated. In this case, the complementary control unit 2903 specifies the transmission device ID "ID0001" of the locational information transmission device 2301 to be controlled using the "transmission device ID" in the locational information 2913. Further, the complementary control unit 2903 specifies that the mobile information terminal 170 corresponding to the app ID "AP0001" could not obtain the sound wave ID but was able to obtain the radio wave ID. Further, the complementary control unit 2903 specifies that control contents in the case of "no" in the sound wave ID and "yes" in the radio wave ID are to change the transmission intervals of radio waves to "once per one second" by using the complementary control information 2911 shown in 8A, for example.

In other words, if the sound wave ID (first identification information) is not included in the obtained information obtained in step S3304, the complementary control unit 2903 determines, as control contents, that the transmission intervals of radio waves to be transmitted by the locational information transmission device 2301 are changed to transmission intervals shorter than the default value.

In step S3307, the complementary control unit 2903 of the location management server 110 transmits control information to control the transmission intervals of radio waves including the radio wave ID to have "one second" to the locational information transmission device 2301 via the PAN transmitter/receiver 120. In addition, the control information to control the transmission intervals of radio waves including the radio wave ID to have "one second" is an example of control information that controls the method of transmitting sound waves to be transmitted by the locational information transmission device 2301 or radio waves to be transmitted by the locational information transmission device 2301.

Further, radio communication by the PAN transmitter/receiver 120 is an example of predetermined radio communication in which the location management server 110 transmits control information to the locational information transmission device 2301. In addition, the process of the PAN transmitter/receiver 120 only transfers (relays) communication between the location management server 110 and the locational information transmission device 2301, so that this process is omitted in the sequence diagrams that follow FIG. 11.

In step S3308, the transmission control unit 2804 of the locational information transmission device 2301 changes the transmission intervals of radio waves including the radio wave ID to one second intervals based on the control information reported from the location management server 110 via the predetermined radio communication by the PAN transmitter/receiver 120.

In steps S3309a to S3309c, radio wave transmitting unit 2803 of the locational information transmission device 2301 intermittently transmits radio waves including the radio wave ID periodically at one second intervals in accordance with control of the transmission control unit 2804.

In steps S3310a to S3310c, the sound wave transmitting unit 2802 of the locational information transmission device 2301 continues to intermittently transmit sound waves including the sound wave ID at the default transmission intervals (one second intervals).

In addition, a time and a method to return the transmission intervals at which the radio wave transmitting unit 2803 transmits radio waves to the default transmission intervals may be arbitrarily set. For example, the transmission control unit 2804 may change the transmission intervals at which the radio wave transmitting unit 2803 transmits radio waves to one second intervals, and return the transmission intervals of radio waves to the default transmission intervals after a predetermined time (one minute, for example) has elapsed. Alternatively, the transmission control unit 2804 may return the transmission intervals at which the radio wave transmitting unit 2803 transmits radio waves to the default transmission intervals based on control information from the location management server 110.

For example, the mobile information terminal 170 shown in FIG. 2A cannot obtain sound waves including the sound wave ID transmitted by the locational information transmission device 2301a. However, the transmission intervals at which the locational information transmission device 2301a transmits radio waves including the radio wave ID are changed from 10 second intervals to one second intervals in accordance with the above process, so that the mobile information terminal 170 can obtain the radio wave ID at one second intervals.

(Example of Second Control)

Figure 12:
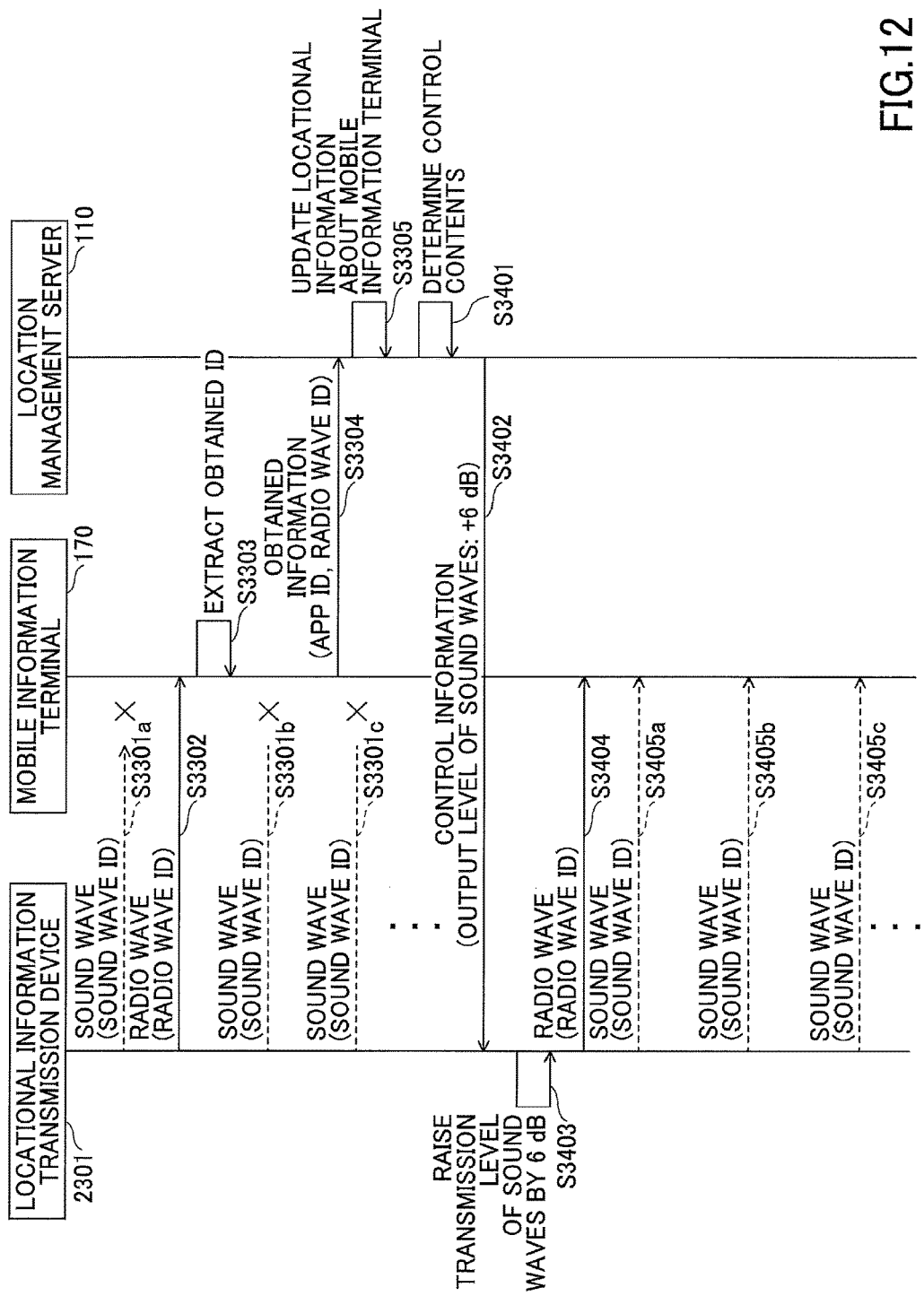
FIG. 12 is a sequence diagram (2) showing a process in a locational information transmission system according to the embodiment.

FIG. 12 is a sequence diagram (2) showing a process in the locational information transmission system according to the embodiment. This process shows another example of the process where the mobile information terminal 170 receives only the radio wave ID with respect to the sound wave ID and the radio wave ID transmitted by the locational information transmission device 2301a in FIG. 2A, for example. In addition, since the process in steps S3301 to S3305 shown in FIG. 12 are the same as in the example of the first control shown in FIG. 11, a difference is mainly described here.

In step S3401, the complementary control unit 2903 of the location management server 110 determines control contents that match the locational information 2913 updated in step S3305. In this case, if the sound wave ID (first identification information) is not included in the obtained information obtained in step S3304, the complementary control unit 2903 determines, as control contents, that an output level of sound waves to be transmitted by the locational information transmission device 2301 is changed to be higher than a default output level.

In step S3402, the complementary control unit 2903 of the location management server 110 transmits control information to control the output level of sound waves including the sound wave ID to be higher (+6 dB, for example) than the default output level to the locational information transmission device 2301 via the PAN transmitter/receiver 120.

In step S3403, the transmission control unit 2804 of the locational information transmission device 2301 changes the output level of sound waves including the sound wave ID to be higher by 6 dB based on the control information reported from the location management server 110 via predetermined radio communication by the PAN transmitter/receiver 120.

In step S3404, the radio wave transmitting unit 2803 of the locational information transmission device 2301 continues to intermittently transmit radio waves including the radio wave ID at the default transmission intervals (10 second intervals).

In steps S3405a to S3405c, the sound wave transmitting unit 2802 of the locational information transmission device 2301 intermittently transmits sound waves including the sound wave ID periodically (one second intervals) at the output level higher than the default output level by 6 dB in accordance with control of the transmission control unit 2804.

In addition, a time and a method by which the transmission control unit 2804 returns the output level of sound waves to the default output level may be arbitrarily set.

For example, the mobile information terminal 170 shown in FIG. 2A cannot obtain sound waves including the sound wave ID transmitted by the locational information transmission device 2301a. However, the output level of sound waves including the sound wave ID to be transmitted by the locational information transmission device 2301a is raised in accordance with the above process, so that the field 2402a where sound waves can be obtained becomes wider as shown in FIG. 2B. Accordingly, it is possible to increase the likelihood for the mobile information terminal 170 to obtain sound waves including the sound wave ID transmitted by the locational information transmission device 2301a.

(Example of Third Control)

Figure 13:
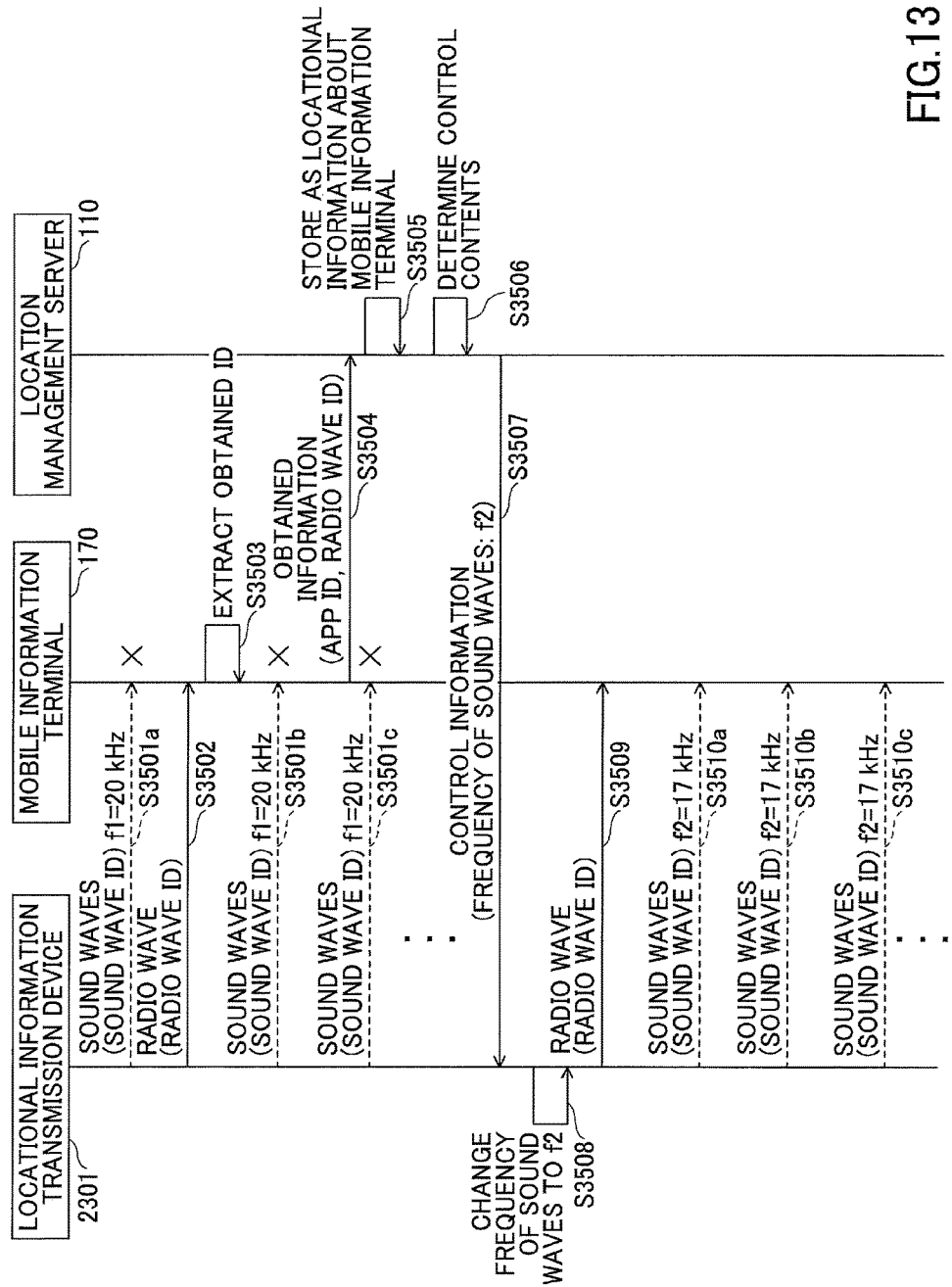
FIG. 13 is a sequence diagram (3) showing a process in a locational information transmission system according to the embodiment.

FIG. 13 is a sequence diagram (3) showing a process in the locational information transmission system according to the embodiment. This process shows yet another example of the process where the mobile information terminal 170 receives only the radio wave ID with respect to the sound wave ID and the radio wave ID transmitted by the locational information transmission device 2301a in FIG. 2A, for example.

In steps S3501a to S3501c, the sound wave transmitting unit 2802 of the locational information transmission device 2301 intermittently transmits sound waves including the sound wave ID at a first center frequency f1 (20 kHz, for example) with the default transmission intervals (one second intervals). However, the sound waves transmitted in steps S3501a to S3501c are not correctly received by the mobile information terminal 170. The reason for being unable to receive correctly is assumed to be poor frequency characteristics of the microphone of the mobile information terminal 170, the first center frequency having surrounding noise, or the like.

The transmission of sound waves including the sound wave ID at the first center frequency is assumed to indicate that the sound waves including the sound wave ID are included within a predetermined band (−5 kHz to +5 kHz) of the first center frequency f1.

In step S3502, the radio wave transmitting unit 2803 of the locational information transmission device 2301 transmits radio waves including the radio wave ID at the default transmission intervals (10 second intervals).

In step S3503, the information extraction unit 2923 of the mobile information terminal 170 extracts IDs (radio wave ID and sound wave ID) included in the sound waves obtained by the sound wave obtaining unit 2921 and in the radio waves obtained by the radio wave obtaining unit 2922. In this case, the radio wave ID included in the radio waves received in step S3502 is extracted by the information extraction unit 2923.

In step S3504, the obtained information transmitting unit 2925 of the mobile information terminal 170 transmits, to the location management server 110, obtained information including the app ID of the mobile information terminal 170 and the radio wave ID extracted in step S3503.

In step S3505, the obtained information receiving unit 2902 of the location management server 110 receives the obtained information transmitted by the mobile information terminal 170. Further, the locational information management unit 2904 of the location management server 110 creates locational information about the mobile information terminal 170 based on the obtained information and updates the locational information 2913 stored in the storage unit 2910.

In step S3506, the complementary control unit 2903 of the location management server 110 determines control contents that match the locational information 2913 updated in step S3505. In this case, if the sound wave ID (first identification information) is not included in the obtained information obtained in step S3504, the complementary control unit 2903 determines, as control contents, that the center frequency of sound waves to be transmitted by the locational information transmission device 2301 is changed to a different center frequency.

In step S3507, the complementary control unit 2903 of the location management server 110 transmits control information to change the center frequency f1 of sound waves including the sound wave ID to a different center frequency f2 to the locational information transmission device 2301 via the PAN transmitter/receiver 120.

In step S3508, the transmission control unit 2804 of the locational information transmission device 2301 changes the center frequency f1 of sound waves including the sound wave ID to the different center frequency f2 based on the control information reported from the location management server 110 via predetermined radio communication by the PAN transmitter/receiver 120.

In step S3509, the radio wave transmitting unit 2803 of the locational information transmission device 2301 continues to intermittently transmit radio waves including the radio wave ID at the default transmission intervals (10 second intervals).

In steps S3510a to S3510c, the sound wave transmitting unit 2802 of the locational information transmission device 2301 intermittently transmits sound waves including the sound wave ID at the center frequency f2 (17 kHz, for example) periodically (one second intervals) in accordance with control of the transmission control unit 2804.

For example, if the microphone of the mobile information terminal 170 has narrow frequency characteristics, the center frequency of sound waves including the sound wave ID to be transmitted by the locational information transmission device 2301a is changed in accordance with the above process. Accordingly, it is possible to increase the likelihood for the mobile information terminal 170 to obtain the sound waves including the sound wave ID.

Further, if there is a source of noise that includes the frequency f1 in the vicinity of the locational information transmission device 2301, for example, the center frequency of sound waves including the sound wave ID to be transmitted by the locational information transmission device 2301a is changed. Accordingly, it is possible to increase the likelihood for the mobile information terminal 170 to obtain the sound waves.

(Example of Fourth Control)

Figure 14:
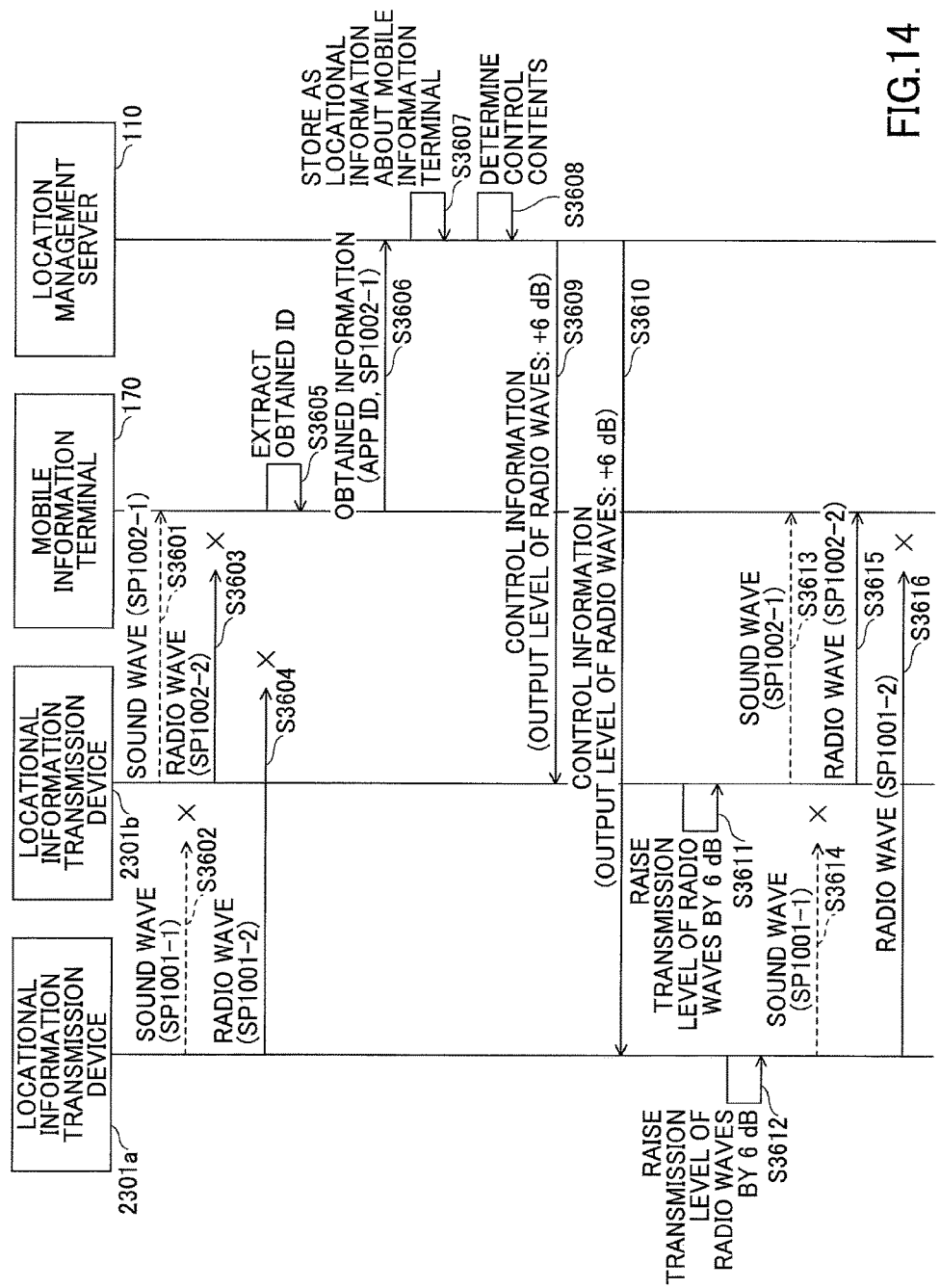
FIG. 14 is a sequence diagram (4) showing a process in a locational information transmission system according to the embodiment.

FIG. 14 is a sequence diagram (4) showing a process in the locational information transmission system according to the embodiment. This process shows an example where the mobile information terminal 170 receives only the sound wave ID with respect to the sound wave ID and the radio wave ID transmitted by the locational information transmission device 2301b in FIG. 2A, for example.

In step S3601, the sound wave transmitting unit 2802 of the locational information transmission device 2301b intermittently transmits sound waves including the sound wave ID "SP1002-1" at the default transmission intervals (one second intervals).

In step S3602, the sound wave transmitting unit 2802 of the locational information transmission device 2301a intermittently transmits sound waves including the sound wave ID "SP1001-1" at the default transmission intervals (one second intervals). However, it is assumed that the sound waves transmitted by the locational information transmission device 2301a do not reach the mobile information terminal 170. In addition, the locational information transmission device 2301a is an example of the locational information transmission device 2301 in the vicinity of the locational information transmission device 2301b.

In step S3603, the radio wave transmitting unit 2803 of the locational information transmission device 2301b transmits radio waves including the radio wave ID at the predetermined transmission intervals (10 second intervals). However, it is assumed that the radio waves including the radio wave ID transmitted by the locational information transmission device 2301b are not correctly received by the mobile information terminal 170.

For example, when the locational information transmission device 2301 transmits radio waves including the radio wave ID in BLE communication, the travelling distance of radio waves varies from about 2.5 to 50 m depending on people around, obstacles, or the like. Accordingly, there may be a case where only sound waves reach the mobile information terminal 170 with respect to radio waves and the sound waves transmitted by the locational information transmission device 2301b in this manner.

In step S3604, the radio wave transmitting unit 2803 of the locational information transmission device 2301a transmits radio waves including the radio wave ID at the predetermined transmission intervals (10 second intervals). However, it is assumed that the radio waves including the radio wave ID transmitted by the locational information transmission device 2301a do not reach the mobile information terminal 170.

In step S3605, the information extraction unit 2923 of the mobile information terminal 170 extracts IDs (radio wave ID and sound wave ID) included in the sound waves obtained by the sound wave obtaining unit 2921 and in the radio waves obtained by the radio wave obtaining unit 2922. In this case, the sound wave ID "SP1002-1" included in the sound waves received in step S3601 is extracted by the information extraction unit 2923.

In step S3606, the obtained information transmitting unit 2925 of the mobile information terminal 170 transmits, to the location management server 110, obtained information including the app ID of the mobile information terminal 170 and the sound wave ID "SP1002-1" extracted in step S3605.

In step S3607, the obtained information receiving unit 2902 of the location management server 110 receives the obtained information transmitted by the mobile information terminal 170. Further, the locational information management unit 2904 of the location management server 110 creates locational information about the mobile information terminal 170 based on the obtained information and updates the locational information 2913 stored in the storage unit 2910.

In step S3608, the complementary control unit 2903 of the location management server 110 determines control contents that match the locational information 2913 updated in step S3607. In this case, if the radio wave ID (second identification information) is not included in the obtained information obtained in step S3606, the complementary control unit 2903 determines, as control contents, that an output level of radio waves to be transmitted by the locational information transmission device 2301 is changed to be higher than a default output level.

In this case, the locational information transmission device 2301 to be controlled may include the neighboring locational information transmission device 2301a in addition to the locational information transmission device 2301b from which the sound waves are obtained in step S3601. This is because the movable mobile information terminal 170 may be moved to a field where the neighboring locational information transmission device 2301 transmits radio waves and sound waves.

In step S3609, the complementary control unit 2903 of the location management server 110 transmits control information to control the output level of radio waves including the radio wave ID to be higher (+6 dB, for example) than the default output level to the locational information transmission device 2301b.

In step S3610, the complementary control unit 2903 of the location management server 110 transmits control information to control the output level of radio waves including the radio wave ID to be higher (+6 dB, for example) than the default output level to the locational information transmission device 2301a.

In step S3611, the transmission control unit 2804 of the locational information transmission device 2301b changes the output level of radio waves including the radio wave ID to be higher (+6 dB, for example) than the default output level based on the control information reported from the location management server 110.

In step S3612, the transmission control unit 2804 of the locational information transmission device 2301a changes the output level of radio waves including the radio wave ID to be higher (+6 dB, for example) than the default output level based on the control information reported from the location management server 110.

In step S3613, the sound wave transmitting unit 2802 of the locational information transmission device 2301b continues to intermittently transmit sound waves including the sound wave ID "SP1002-1" at the default transmission intervals (one second intervals).

In step S3614, the sound wave transmitting unit 2802 of the locational information transmission device 2301a continues to intermittently transmit sound waves including the sound wave ID "SP1001-1" at the default transmission intervals (one second intervals).

In step S3615, the radio wave transmitting unit 2803 of the locational information transmission device 2301b intermittently transmits radio waves including the radio wave ID "SP1002-2" periodically at the output level higher than the default output level by 6 dB in accordance with control of the transmission control unit 2804.

In step S3616, the radio wave transmitting unit 2803 of the locational information transmission device 2301a intermittently transmits radio waves including the radio wave ID "SP1001-2" periodically at the output level higher than the default output level by 6 dB in accordance with control of the transmission control unit 2804.

In accordance with the above process, the output level of radio waves including the radio wave ID to be transmitted by the locational information transmission devices 2301a and 2301b is raised, so that the travelling distance of radio waves is increased. Accordingly, it is possible to increase the likelihood for the mobile information terminal 170 to obtain the radio wave IDs.

(Example of Fifth Control)

Figure 15:
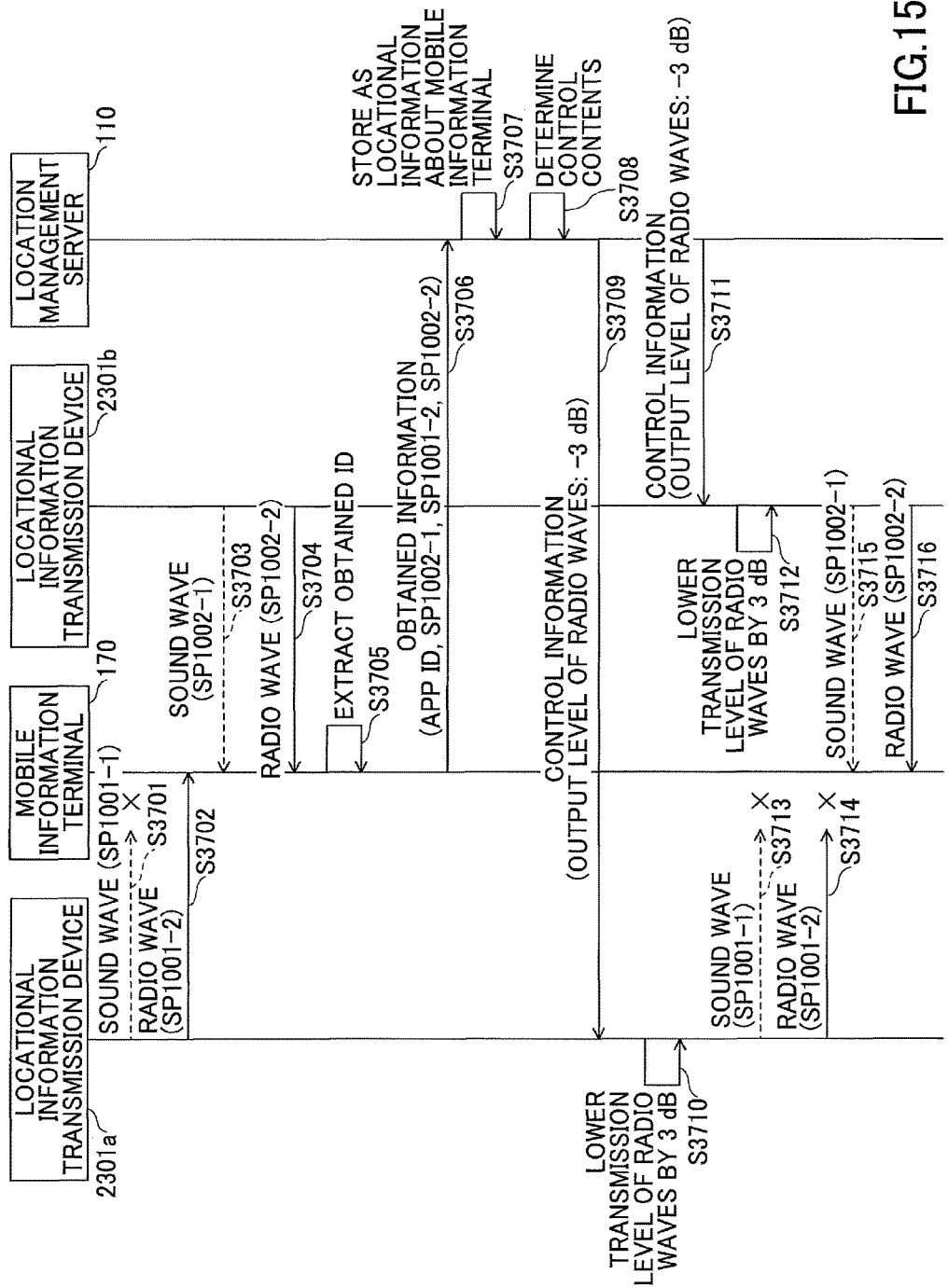
FIG. 15 is a sequence diagram (5) showing a process in a locational information transmission system according to the embodiment.

FIG. 15 is a sequence diagram (5) showing a process in the locational information transmission system according to the embodiment. This process shows an example where the mobile information terminal 170 receives radio wave IDs transmitted by the locational information transmission devices 2301a and 2301b, for example.

At a start of the process shown in FIG. 15, the mobile information terminal 170 is assumed to be within the field 2402b with respect to the fields shown in FIG. 2A, for example.

In step S3701, the sound wave transmitting unit 2802 of the locational information transmission device 2301a intermittently transmits sound waves including the sound wave ID "SP1001-1" at the default transmission intervals (one second intervals). However, it is assumed that the sound waves transmitted by the locational information transmission device 2301a do not reach the mobile information terminal 170.

In step S3702, the radio wave transmitting unit 2803 of the locational information transmission device 2301a transmits radio waves including the radio wave ID "SP1001-2" at the predetermined transmission intervals (10 second intervals).

In step S3703, the sound wave transmitting unit 2802 of the locational information transmission device 2301b intermittently transmits sound waves including the sound wave ID "SP1002-1" at the default transmission intervals (one second intervals).

In step S3704, the radio wave transmitting unit 2803 of the locational information transmission device 2301b transmits radio waves including the radio wave ID "SP1002-2" at the predetermined transmission intervals (10 second intervals).

In step S3705, the information extraction unit 2923 of the mobile information terminal 170 extracts IDs (radio wave ID and sound wave ID) included in the sound waves obtained by the sound wave obtaining unit 2921 and in the radio waves obtained by the radio wave obtaining unit 2922. In this case, the radio wave ID "SP1001-2" obtained in step S3702, the sound wave ID "SP1002-1" obtained in step S3703, and the radio wave ID "SP1002-2" obtained in step S3704 are extracted.

In step S3706, the obtained information transmitting unit 2925 of the mobile information terminal 170 transmits, to the location management server 110, obtained information including the app ID, the extracted radio wave IDs "SP1001-2" and "SP1002-2," and the extracted sound wave ID "SP1002-1."

In step S3707, the obtained information receiving unit 2902 of the location management server 110 receives the obtained information transmitted by the mobile information terminal 170. Further, the locational information management unit 2904 of the location management server 110 creates locational information about the mobile information terminal 170 based on the obtained information and updates the locational information 2913 stored in the storage unit 2910.

In step S3708, the complementary control unit 2903 of the location management server 110 determines control contents that match the locational information 2913 updated in step S3707. In this case, if a plurality of the radio wave IDs (second identification information) are included in the obtained information, the complementary control unit 2903 determines, as control contents, that the output level of radio waves to be transmitted by the locational information transmission devices 2301a and 2301b is changed to be lower than the default output level.

In this case, the complementary control unit 2903 of the location management server 110 may exclude the locational information transmission device 2301b, from which the sound wave ID is obtained, from locational information transmission devices 2301 to be controlled.

In step S3709, the complementary control unit 2903 of the location management server 110 transmits control information to control the output level of radio waves including the radio wave ID to be lower (−3 dB, for example) than the default output level to the locational information transmission device 2301a.

In step S3710, the transmission control unit 2804 of the locational information transmission device 2301a changes the output level of radio waves including the radio wave ID to be lower than the default output level by 3 dB based on the control information reported from the location management server 110.

In step S3711, the complementary control unit 2903 of the location management server 110 transmits control information to control the output level of radio waves including the radio wave ID to be lower (−3 dB, for example) than the default output level to the locational information transmission device 2301b.

In step S3712, the transmission control unit 2804 of the locational information transmission device 2301b changes the output level of radio waves including the radio wave ID to be lower than the default output level by 3 dB based on the control information reported from the location management server 110.

In step S3713, the sound wave transmitting unit 2802 of the locational information transmission device 2301a continues to intermittently transmit sound waves including the sound wave ID "SP1001-1" at the default transmission intervals (one second intervals).

In step S3714, the radio wave transmitting unit 2803 of the locational information transmission device 2301a intermittently transmits radio waves including the radio wave ID "SP1001-2" periodically at the output level lower than the default output level by 3 dB in accordance with control of the transmission control unit 2804. Accordingly, it is possible to reduce an influence of radio waves on a field assigned to the neighboring locational information transmission device 2301b, the radio waves being transmitted by the radio wave transmitting unit 2803 of the locational information transmission device 2301a.

In step S3715, the sound wave transmitting unit 2802 of the locational information transmission device 2301b continues to intermittently transmit sound waves including the sound wave ID "SP1002-1" at the default transmission intervals (one second intervals).

In step S3716, the radio wave transmitting unit 2803 of the locational information transmission device 2301b intermittently transmits radio waves including the radio wave ID "SP1002-2" periodically at the output level lower than the default output level by 3 dB in accordance with control of the transmission control unit 2804.

In accordance with the above process, the output level of radio waves including the radio wave ID to be transmitted by the locational information transmission devices 2301a and 2301b is lowered, so that the travelling distance of radio waves is reduced. Accordingly, it is possible to reduce an influence on another adjacent field.

(Example of Sixth Control)

Figure 16:
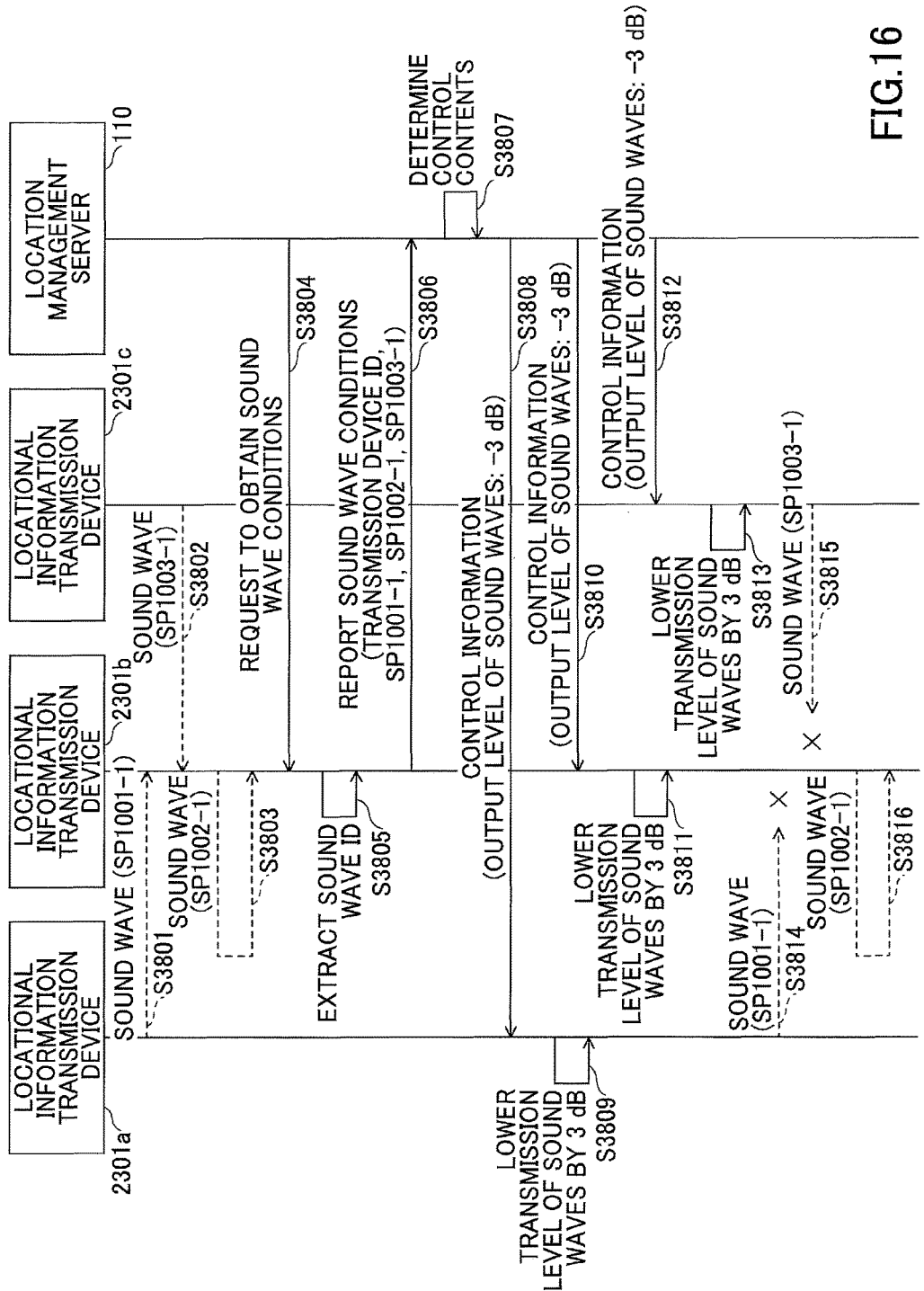
FIG. 16 is a sequence diagram (6) showing a process in a locational information transmission system according to the embodiment.

FIG. 16 is a sequence diagram (6) showing a process in the locational information transmission system according to the embodiment. This process shows an example where the output level of radio waves to be transmitted by a plurality of locational information transmission devices 2301a to 2301c is changed based on sound waves obtained by the sound wave collection unit 2805 included in the locational information transmission device 2301b.

In step S3801, the sound wave transmitting unit 2802 of the locational information transmission device 2301a intermittently transmits sound waves including the sound wave ID "SP1001-1" at the default transmission intervals.

In step S3802, the sound wave transmitting unit 2802 of the locational information transmission device 2301c intermittently transmits sound waves including the sound wave ID "SP1003-1" at the default transmission intervals.

In step S3803, the sound wave transmitting unit 2802 of the locational information transmission device 2301b intermittently transmits sound waves including the sound wave ID "SP1002-1" at the default transmission intervals.

In step S3804, the locational information transmission device 2301b receives a request to obtain sound wave conditions from the location management server 110 via the PAN transmitter/receiver 120.

In step S3805, when the sound wave analysis unit 2806 of the locational information transmission device 2301b receives the request to obtain sound wave conditions from the location management server 110, the sound wave analysis unit 2806 extracts the sound wave ID included in surrounding sound waves obtained by the sound wave collection unit 2805. In this case, it is assumed that three sound wave IDs "SP1001-1," "SP1002-1," and "SP2003-1" are extracted.

In step S3806, the sound wave analysis unit 2806 reports sound wave conditions including the transmission device ID of the locational information transmission device 2301b and the extracted three sound wave IDs "SP1001-1," "SP1002-1," and "SP2003-1" to the location management server 110.

In step S3807, the complementary control unit 2903 of the location management server 110 determines control contents for the locational information transmission device 2301b and its surrounding locational information transmission devices 2301 based on the sound wave conditions reported from the locational information transmission device 2301b. In this case, if a plurality of the sound wave IDs are included in the reported sound wave conditions, the complementary control unit 2903 determines, as control contents, that the output level of sound waves to be transmitted by the locational information transmission devices 2301a to 2301c is changed to be lower than the default output level.

In step S3808, the complementary control unit 2903 of the location management server 110 transmits control information to control the output level of sound waves including the sound wave ID to be lower (−3 dB, for example) than the default output level to the locational information transmission device 2301a.

In step S3809, the transmission control unit 2804 of the locational information transmission device 2301a changes the output level of sound waves including the sound wave ID to be lower than the default output level by 3 dB based on the control information reported from the location management server 110.

In step S3810, the complementary control unit 2903 of the location management server 110 transmits control information to control the output level of sound waves including the sound wave ID to be lower (−3 dB, for example) than the default output level to the locational information transmission device 2301b.

In step S3811, the transmission control unit 2804 of the locational information transmission device 2301b changes the output level of sound waves including the sound wave ID to be lower than the default output level by 3 dB based on the control information reported from the location management server 110.

In step S3812, the complementary control unit 2903 of the location management server 110 transmits control information to control the output level of sound waves including the sound wave ID to be lower (−3 dB, for example) than the default output level to the locational information transmission device 2301c.

In step S3813, the transmission control unit 2804 of the locational information transmission device 2301c changes the output level of sound waves including the sound wave ID to be lower than the default output level by 3 dB based on the control information reported from the location management server 110.

In step S3814, the sound wave transmitting unit 2802 of the locational information transmission device 2301a intermittently transmits sound waves including the sound wave ID "SP1001-1" periodically at the output level lower than the default output level by 3 dB in accordance with control of the transmission control unit 2804. Accordingly, it is possible to reduce an influence of sound waves on a field assigned to the locational information transmission device 2301b, the sound waves being transmitted by the sound wave transmitting unit 2802 of the locational information transmission device 2301a.

In step S3815, the sound wave transmitting unit 2802 of the locational information transmission device 2301c intermittently transmits sound waves including the sound wave ID "SP1003-1" periodically at the output level lower than the default output level by 3 dB in accordance with control of the transmission control unit 2804. Accordingly, it is possible to reduce an influence of sound waves on the field assigned to the locational information transmission device 2301b, the sound waves being transmitted by the sound wave transmitting unit 2802 of the locational information transmission device 2301c.

In step S3816, the sound wave transmitting unit 2802 of the locational information transmission device 2301b intermittently transmits sound waves including the sound wave ID "SP1002-1" periodically at the output level lower than the default output level by 3 dB in accordance with control of the transmission control unit 2804.

While the sound wave analysis unit 2806 of the locational information transmission device 2301*b* extracts the sound wave ID (step S3805) included in sound waves obtained by the sound wave collection unit 2805 in the above process, the sound wave analysis unit 2806 may obtain a noise level in the vicinity thereof as sound wave conditions.

In this case, if the sound wave conditions indicate that the noise level in the vicinity is high, the sound wave conditions being reported from the locational information transmission device 2301*b*, the complementary control unit 2903 of the location management server 110 may perform control to lower the output level of sound waves of the locational information transmission devices 2301*a* to 2301*c*.

According to the embodiment of the present invention, it is possible to provide a locational information transmission device that improves accuracy of locational information to be reported to a moving information terminal in a locational information transmission system that outputs locational information indoors, for example.

Further, the present invention is not limited to these embodiments, and various variations and modifications may be made without departing from the scope of the present invention.

The present application is based on and claims the benefit of priorities of Japanese Priority Application No. 2015-035693 filed on Feb. 25, 2015 and Japanese Priority Application No. 2015-215161 filed on Oct. 30, 2015, the entire contents of which are hereby incorporated by reference.

What is claimed is:

1. A locational information transmission apparatus that transmits information for identifying a location, the locational information transmission apparatus comprising a processor and a memory that executes instructions and causes:
   transmitting a sound wave at a sound output level, the sound wave including first identification information;
   transmitting a radio wave including second identification information that is different from the first identification information; and
   increasing the sound output level, depending on control information which has been received, when the control information which has been received indicates receipt of the second identification information and omission of the first identification information,
   increasing a strength of the radio wave, depending on the control information which has been received, when the control information which has been received indicates receipt of the first identification information and omission of the second identification information.

2. The locational information transmission apparatus as claimed in claim 1, wherein:
   the transmitting of the sound wave transmits the sound wave at a predetermined center frequency, and
   the executing of the instructions further cause changing the center frequency depending on the control information.

3. The locational information transmission apparatus as claimed in claim 1, wherein the processor further executes:
   collecting surrounding sound waves around the locational information transmission apparatus.

4. A locational information transmission system comprising:
   a locational information transmission apparatus that transmits information for identifying a location, the locational information transmission apparatus comprising a processor that executes instructions which cause:
      transmitting a sound wave at a sound output level, the sound wave including first identification information;
      transmitting a radio wave including second identification information that is different from the first identification information; and
   an information processing device for communicating with the locational information transmission apparatus which communicates with a mobile terminal, the information processing device including:
      a receiver that receives the first identification information or the second identification information as obtained information transmitted via the mobile terminal, and
      a transmitter that transmits:
         control information for increasing the sound output level of the sound wave transmitted by the locational information transmission apparatus, when the obtained information that has been received includes the second identification information and omits the first identification information, and
         control information for increasing a strength of the radio wave transmitted by the locational information transmission apparatus, when the obtained information that has been received includes the first identification information and omits the second identification information,
      a processor to update location information of the mobile terminal which is stored in a memory, when the obtained information includes the first identification information and the second identification information.

5. The locational information transmission system as claimed in claim 4, wherein if the first identification information is not included in the obtained information, the processor of the information processing device reports, to the locational information transmission apparatus, the control information to shorten time intervals at which the locational information transmission apparatus transmits the radio wave.

6. The locational information transmission system as claimed in claim 4, wherein if the first identification information is not included in the obtained information, the processor of the information processing device reports, to the locational information transmission apparatus, the control information to change a center frequency at which the locational information transmission apparatus transmits the sound wave.

7. The locational information transmission system as claimed in claim 4, further comprising:
   a plurality of the locational information transmission apparatuses disposed at mutually different locations,
   wherein the information processing device includes:
   a management processor that manages location management information in which the first identification information and the second identification information about the plurality of the locational information transmission apparatuses are stored in association with information about locations where the plurality of the locational information transmission apparatuses are disposed.

8. The locational information transmission system as claimed in claim 7, wherein if a plurality of pieces of the first identification information are included in the obtained information, the processor of the information processing device reports, to at least one of the plurality of the locational information transmission apparatuses corresponding to the plurality of pieces of the first identification information, the control information to lower a sound output level at which the at least one of the plurality of the locational information transmission apparatuses transmits the sound wave.

9. The locational information transmission system as claimed in claim 7, wherein if a plurality of pieces of the second identification information are included in the obtained information, the processor of the information processing device reports, to at least one of the plurality of the locational information transmission apparatuses corresponding to the plurality of pieces of the second identification information, the control information to lower a radio output level at which the at least one of the plurality of the locational information transmission apparatuses transmits the radio wave.

10. The locational information transmission system as claimed in claim 7, wherein if the second identification information is not included in the obtained information, the processor of the information processing device reports, to one or more of the plurality of the locational information transmission apparatuses including one of the plurality of the locational information transmission apparatuses that corresponds to the first identification information included in the obtained information, the control information to lower a radio output level at which the one or more of the plurality of the locational information transmission apparatuses transmit the radio wave.

11. A locational information transmission system comprising:
the locational information transmission apparatus as claimed in claim 3; and
an information processing device which communicates with the locational information transmission apparatus via radio communication, the information processing device including:
a processor that reports, to the locational information transmission apparatus via the radio communication, the control information to control, based on conditions of the surrounding sound waves collected by the collecting of surrounding sound waves, a sound output level at which the locational information transmission apparatus transmits the sound wave.

12. The locational information transmission system as claimed in claim 11, further comprising:
an analysis processor that analyzes, based on the surrounding sound waves collected by the collecting of the surrounding sound waves, the first identification information included in the sound wave transmitted by the locational information transmission apparatus.

13. The locational information transmission apparatus as claimed in claim 1, wherein:
the transmitting of the radio wave transmits the radio wave at predetermined time intervals, and
the increasing further includes changing the time intervals depending on the control information.

* * * * *